US005291199A

United States Patent [19]

Overman et al.

[11] Patent Number: 5,291,199

[45] Date of Patent: Mar. 1, 1994

[54] THREAT SIGNAL DETECTION SYSTEM

[75] Inventors: Kelly C. Overman, Millers; Donald B. Klein; Sabra R. Crosby, both of Columbia, all of Md.; Emil Hensel, Rego Park, N.Y.

[73] Assignee: Westinghouse Electric Corp., Pittsburgh, Pa.

[21] Appl. No.: 757,404

[22] Filed: Jan. 6, 1977

[51] Int. Cl.[5] .......................... G01S 7/36; G01S 7/42

[52] U.S. Cl. ...................................... 342/13; 342/175

[58] Field of Search ............... 343/117 R, 18 E, 55 A; 324/77 R, 77 B, 77 C, 77 CS, 77 D; 342/13, 175

[56] References Cited

U.S. PATENT DOCUMENTS

| | | | |
|---|---|---|---|
| 3,720,871 | 3/1973 | Brown | 324/77 R |
| 3,940,768 | 2/1976 | Olsen et al. | 343/18 E |
| 3,943,510 | 3/1976 | Orton | 343/18 E |

*Primary Examiner*—Theodore M. Blum
*Attorney, Agent, or Firm*—Eugene LeDonne

[57] ABSTRACT

A tracking system for predicting the incidence of threat signals having at least one beam at a predetermined location in space in which a receiver detects the incidence of the threat signals at the predetermined location, a tracker cooperates with the receiver to predict the detection of threat signals by the receiver, and a controller condenses threat signals from harmonically related beams of a pulse group detected by the receiver and controls the predictions of the tracker in response to the characteristics of the condensed threat signals.

6 Claims, 15 Drawing Sheets

THREAT SIGNAL DETECTION SYSTEM

BACKGROUND OF THE INVENTION

1. Field of the Invention:

The present invention relates to threat signal detection systems for detecting the incidence of threat signals having at least one beam and, more particularly, to a threat detection system in which a controller condenses threat signals from harmonically related beams sorted from a group of detected pulses.

2. Description of the Prior Art:

As is known in the radar art, devices which employ active radar systems necessarily contain signal emitters whose emitted signals, commonly known as beams and so referred to herein, may be used to identify the device after the characteristics of the emitted signals, or beams, have been established. That is, devices which employ active radar systems contain at least one signal emitter which can be used to identify the device after the beam characteristics for the emitter are determined and have been associated with the particular device.

In the military sciences, devices which employ active radar systems include offensive and defensive weapons as well as their delivery vehicles. Although such weapons and their delivery vehicles are often used in a defensive posture, the presence of a weapon or a delivery vehicle will be considered to be a threat to the successful mission and/or survival of the opposing military force so that all such military devices employing active radar systems are, quite properly, designated as threats by the opposing force. Therefore, according to the general experience of the radar art as applied to use in the military sciences, it is well known in the prior art that military threats containing active radar systems may be detected in accordance with at least one beam which is known to be associated with the threat. Accordingly, the combination of one or more beams which emanate from a single threat have come to be known as a threat signal.

In the prior art, threat detection systems have detected threats by detecting beams which have characteristics within a predetermined range and comparing these detected beams to stored beams of similar characteristics which are known to be associated with a particular threat. In these prior art threat detection systems, the beams of the threat signals were detected by a receiver in response to the incidence of the beams on an antenna that is responsive to microwave energy. More particularly, a processor swept the receiver over predetermined frequency ranges and, when pulses were detected by the receiver, the processor extended the dwell of the receiver at that frequency to enable the receiver to collect a group of pulses which were stored in a buffer memory. The processor then sorted out pulses from this pulse group to form beams and collected harmonically related group had substantially the same radio frequency and was some multiple of a fundamental pulse repetition interval for the harmonically related beam group. Additional comparisons between the beams were then made to determine whether the beams were staggered with respect to each other. The beams thus formed were compared to stored beams which had a predetermined association with known threats so that, when beams were detected which matched the stored beams associated with a particular threat, the detected beams were recognized as detected threat signals whose further detection by the receiver could be predicted by a signal tracker.

These prior art threat detection systems operated on a premise that only beams which had substantially the same radio frequency and pulse repetition interval could be staggered with respect to each other as beams of a single threat signal. There were, however, situations in which this premise was inaccurate. For example, one may consider a threat signal which consists of three stagger levels, or beams, of equal PRI in which the first and third beams are staggered by one-half their pulse repetition intervals and the second beam is situated intermediate between the first and third beams. In this situation, the prior art threat signal detection system could sort out a single detected beam from the pulses of the first and third beams and would then sort out a second beam having the same radio frequency, but with a pulse repetition interval which was twice that of the first detected beam from the pulses of the second stagger level. Since the prior art threat detection system presumed that only beams having the same pulse repetition interval could be staggered with respect to each other as beams of a single threat signal, two threats would be detected when, in fact, only one threat existed. As a second example, consider the same threat signal as described above which, in this case, is sorted to form one detected beam having a PRI substantially equal to the interval distance between the first and third beams and three additional detected beams having PRI's substantially equal to three times the PRI of the first beam. Here again, the prior art threat detector would detect two threat signals because the prior art system presumed that only beams having the same PRI could be staggered with respect to each other as beams of a single threat signal. In both these examples, it is apparent that the threat detection system would never accurately detect the threat. Rather, the threat signals which were detected would represent non-existent threats which would serve to confuse the tracking system while, even more critically, the threat detection system would fail to recognize a physically existent threat.

The above-described situation in which a multiple of phantom threat signals are detected as a consequence of the sorting of a plurality of beams having different pulse repetition intervals became even more aggravated in those threat detection systems which would detect a beam of a threat signal despite the occasional absence of a pulse in the beam. Prior art threat detection systems were provided with this capability to enable them to detect beams in which occasional pulses were deliberately deleted from the transmission of the threat radar, or where the detection of an occasional pulse inadvertently failed. In these detection systems, pulses of the detected pulse group which were sorted to form a first beam of a given pulse repetition interval were assumed to have been undetected pulses when constructing beams having a different pulse repetition interval. The introduction of this capability of a threat detection system to ignore the occasional absence of a pulse when sorting beams from a pulse group magnifies the permutations of erroneously detected threat signals by orders of magnitude.

Subsequently, it has been realized that the errors of these prior art threat signal detection systems are a consequence of the failure of these systems to accurately detect the staggered nature of multiple stagger level threat signals. Further, it was realized that this inadequacy could be alleviated by considering all the detected beams which were harmonically related in pulse repetition interval to determine the stagger level of the threat signal since the erroneously detected threats arose as a consequence of the detected beams which comprise the threat signals being staggered by some multiple of a basic pulse repetition interval.

SUMMARY OF THE INVENTION

In accordance with the presently disclosed apparatus for detecting threat signals, a receiver detects the incidence of pulses on an antenna in response to the command signal from a controller and the controller then condenses threat signals from harmonically related beams that are sorted from the pulse group.

DESCRIPTION OF THE PREFERRED EMBODIMENT

As was explained previously, threat signal detectors of the prior art detected threat signals by commanding a receiver to dwell at a particular frequency to detect the incidence of a group of pulses on an antenna, sorting beams from this group of pulses, and by comparing certain parameters of the detected beams with stored beam parameters that were previously known to be associated with particular threats. However, in the prior art, in situations where beams of a single threat signal were staggered by some harmonic of their pulse repetition interval, the prior art threat signal detectors could sort a pulse group into a plurality of beams having substantially equal radio frequency but having different harmonics of a fundamental pulse repetition interval value. Since these threat signal detectors operated on a premise that only beams having substantially identical pulse repetition intervals could be staggered with respect to each other to comprise a single threat signal, these threat signal detectors would not accurately detect the threat signal but, rather, would detect phantom threat signals that would confuse the entire radar system while failing to recognize the true threat signal. The preferred embodiment of the present invention accurately detects threat signals which have beams staggered by some harmonic of the fundamental pulse repetition interval by condensing all of the beams having harmonically related pulse repetition intervals to comprise the threat signal.

Figure 1:
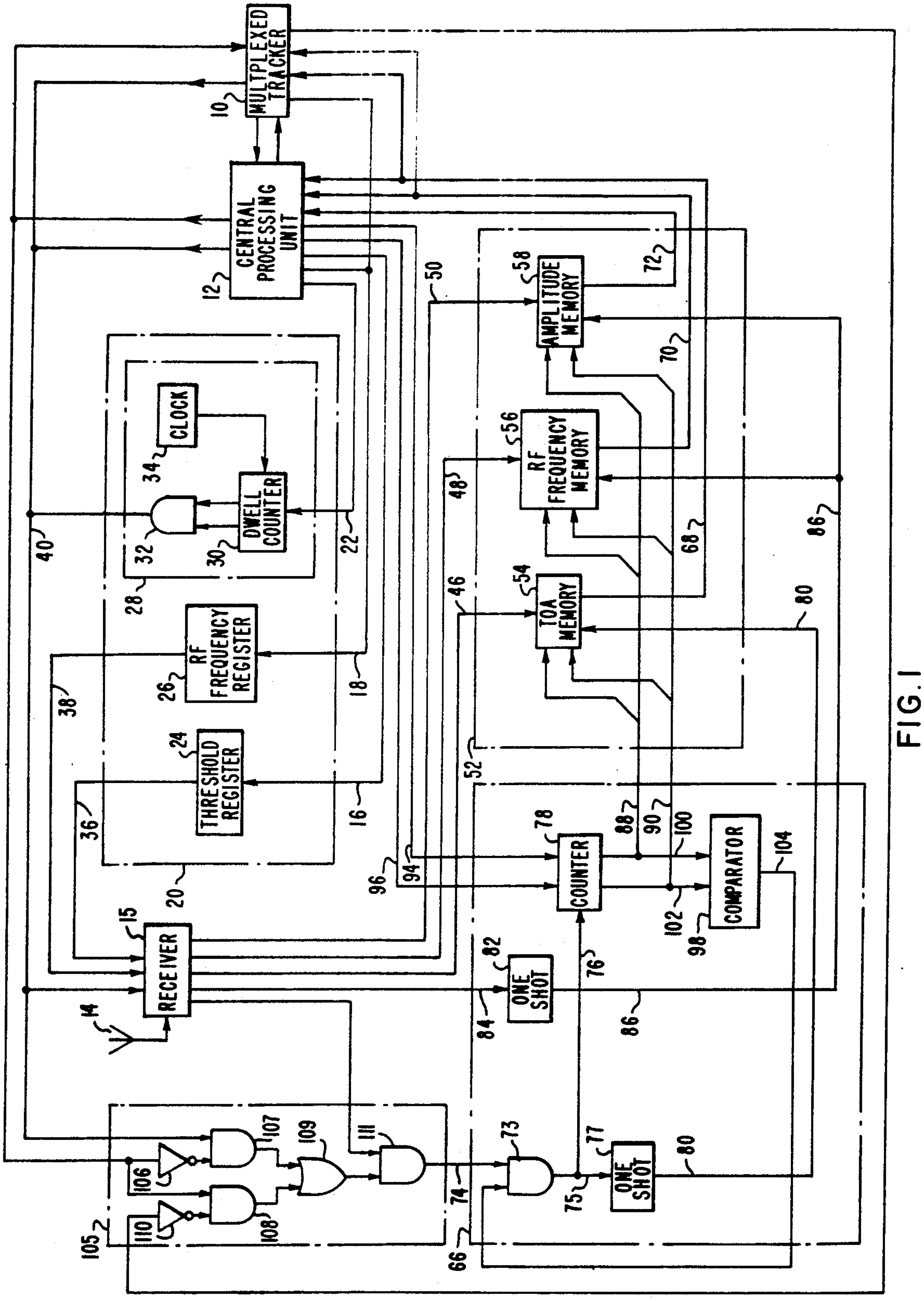
FIG. 1 is a block diagram showing the apparatus employed in the preferred embodiment of the present invention.

The preferred embodiment of the disclosed apparatus for detecting a threat signal having beams that are staggered by some multiple of a fundamental pulse repetition interval is described in relation to FIG. 1. In the operation of the disclosed apparatus, a processing device which, in the example of the preferred embodiment, is a multiplex tracker which is further described in relation to FIGS. 3 through 7, but which could equivalently be a signal intercept system as well known to those skilled in the pertinent art, cooperates with a central processing unit 12 to predict the incidence of a threat signal on an antenna 14 which is coupled to a receiver 15. The threat signal is comprised of phase coherent beams whose parameters are characteristic of the threat. Initially, predetermined parameters of beams are stored in the central processing unit 12 with these predetermined parameters hereafter referred to as stored beams. The associations of these stored beams with various particular threats in accordance with predetermined information is also stored in the memory of the central processing unit 12, with the association of one or more of those stored beams with a threat hereafter referred to as a stored threat. The central processing unit 12 may be comprised of a general purpose digital computer such as the Westinghouse Millicomputer CP-1138 which has been in public use for more than one year and which is more fully described in a publication entitled "CP-1138 Millicomputer", copyright 1972 by Westinghouse Electric Corporation, and published by Westinghouse Electric Corporation, Defense and Electronic Systems Center, Systems Development Division, Baltimore, Md. According to the operation of the disclosed apparatus, the central processing unit 12 provides the information of the stored threats and their respective stored beams to the receiver 15 through the receiver control 20. Specifically the central processing unit 12 causes the receiver 15 to detect beams having parameters substantially similar to the parameters of the stored beams by providing signals on lines 16, 18 and 22 to a receiver control 20. The signals provided to the receiver control 20 substantially correspond to the radio frequency (hereafter referred to as RF) and amplitude parameters of the stored beams. The receiver control 20 includes a threshold register 24 and a radio frequency register (hereafter referred to as RF register) 26 and an enable signal generator 28 which includes a dwell counter 30, an AND gate 32 and a clock 34. The threshold register 24 and the RF register 26 respectively operate in response to the signals provided by the central processing unit 12 on lines 16 and 18 to provide an amplitude threshold control signal on line 36 and an RF control signal on line 38 to the receiver 15. The enable signal generator 28 provides an enable signal on line 40 to the receiver 15 in response to the timing signal provided by the processing unit 12 on line 22 to the dwell counter 30. This timing signal establishes a value in the dwell counter 30 which is counted down by the rate at which pulses are provided from the clock 34 to the dwell counter 30. The dwell counter 30 provides an output signal to the AND gate 32 such that the AND gate 32 provides an enable signal on line 40 to the receiver 15 as long as the value of the dwell counter 30 is positive. Therefore, if the clock 34 operates at a fixed rate, the duration of the enable signal on line 40 will be determined by the magnitude of the value established by the timing signal provided to the dwell counter 30 by the central processing unit 12.

The antenna 14 collects microwave or radio frequency (RF) signals which are propagating in a line which coincides with the antenna position and provides these signals to the receiver 15. In response to the control signals provided to the receiver control 20, the receiver 15 detects signals that are collected by the antenna 14 which substantially correspond to the RF frequency control signal on line 38 and to the amplitude threshold control signal on line 36. The receiver 15 may be comprised of any such wellknown device which, for example, may be a Varian receiver, Part No. VZZ-3017 or, alternatively, Varian receiver, Part No. VZX-3017.

Figure 2:
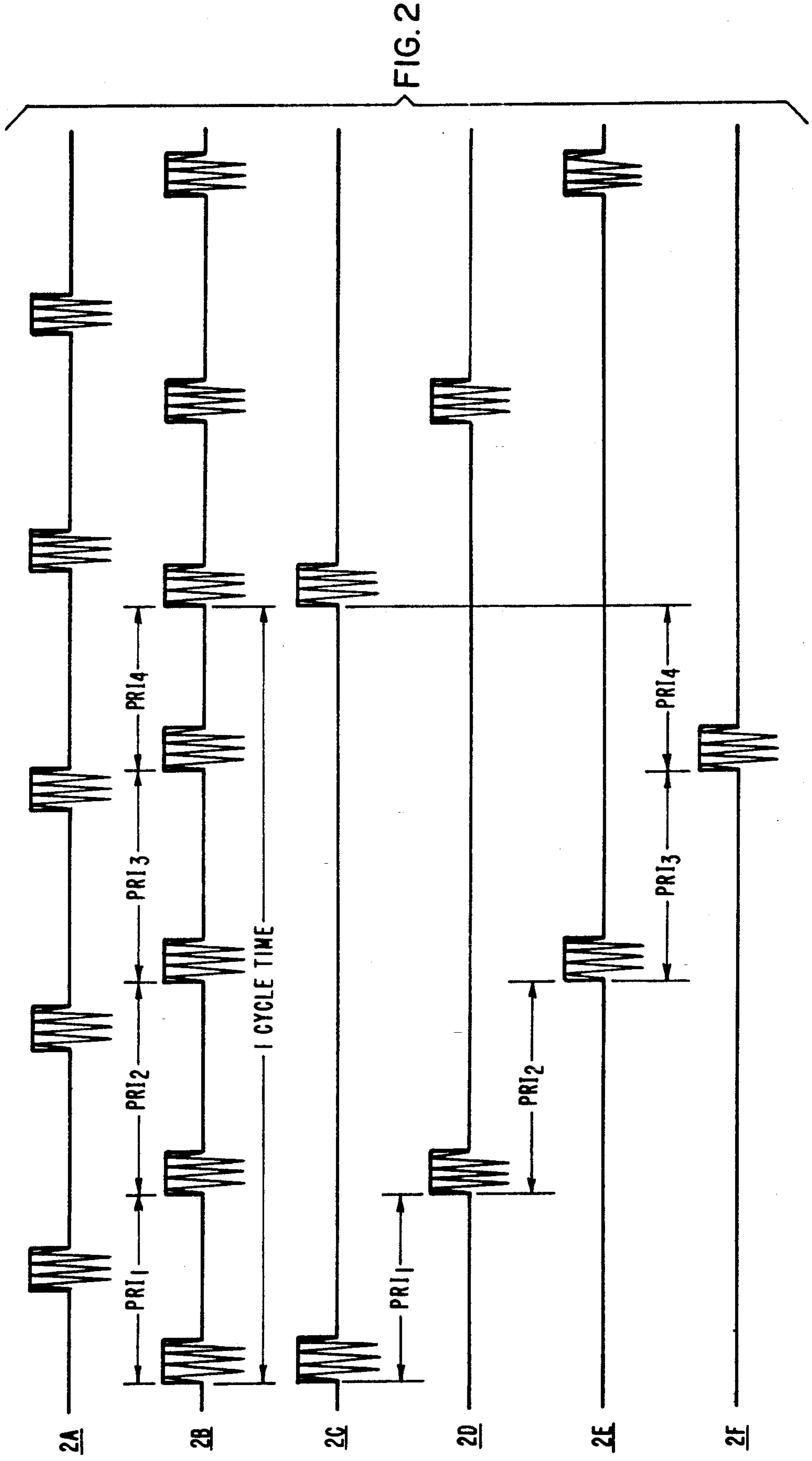
FIG. 2 illustrates the waveforms of two threat signals which have single and multiple beams respectively, and shows various parameters of the threat signals.

Typical signals which are detected by the receiver 15 are illustrated in waveforms 2A and 2B of FIG. 2. The time of arrival (TOA), radio frequency (RF), and amplitude of the pulses of signals detected by the receiver 15 are respectively provided on lines 46, 48 and 50 to a buffer memory 52 which is comprised of a time of arrival memory (TOA memory) 54, a radio frequency memory (RF memory) 56, and an amplitude memory 58. For each pulse detected by the receiver 15, the TOA memory 54 stores the time of arrival (TOA) of the pulse, the RF memory 56 stores the RF of the signal whose envelope determines the pulse, and the amplitude memory 58 records the amplitude of each detected pulse in response to address and write signals provided by a buffer memory control 66.

The buffer memory control 66 provides the appropriate address and write signals to the buffer memory 52 to provide for the storage of the information detected by the receiver 15 in the TOA memory 54, the RF memory 56 and the amplitude memory 58. The buffer memory control 66 also provides the appropriate address and read signals to provide for the delivery of the pulse information stored in the buffer memory 52 to the central processing unit 12. The buffer memory control 66 may be comprised of any suitable combination of logic elements which perform the abovedescribed functions as is well known to those skilled in the pertinent art. The example of the preferred embodiment of FIG. 1 includes an AND gate 73 which is responsive to a TOA receiver strobe signal on line 74 and which supplies an enable signal on lines 75 and 76 to a one-shot generator 77 and a counter 78 respectively. The one-shot generator 77 provides a TOA write signal on line 80 and a second one-shot generator 82, which is responsive to a receiver conversion signal on line 84, provides an amplitude and an RF write signal on line 86. The counter 78 provides the TOA, RF and amplitude memory address signals on lines 88 and 90 in response to an enable signal from the AND gate 73 on line 76, or in response to the combination of read and address signals on lines 94 and 96 respectively from the processing unit 12. The address signals of the counter 78 are also provided to a comparator 98 on lines 100 and 102. The comparator 98 is hard wired to provide a maximum count signal on line 104 to the AND gate 73 unless the comparator 98 determines that the capacity of the buffer memory 52 has been exceeded.

In the operation of the buffer memory control 66 to store signals detected by the receiver 15 in the buffer memory 52, the AND gate 73 receives the TOA receiver strobe signal on line 74 which is provided by the receiver 15 whenever a pulse is detected by the receiver provided a verify command network 105 is conductive. If the maximum count signal is simultaneously present on line 104 when the receiver strobe signal is received, the AND gate 73 provides an enable signal to the counter 78 which provides a pulse address on lines 88 and 90 to the TOA memory 54, the RF frequency memory 56, and the amplitude memory 58. At the same time, the AND gate 73 provides an enable signal to the one-shot generator 77 which, as well known in the art, provides a short TOA write pulse on line 80 in response to an increase in the amplitude level of the signal on line 75 to permit the receiver 15 to write the time of arrival (TOA) of the detected pulse into the TOA memory 54 at the address designated by the counter 78. If the receiver 15 determines that the detected pulse which arrived at the receiver 15 at the time stored at the address of the TOA memory 54 contained the requisite RF and amplitude called for by the amplitude and RF control signals on lines 36 and respectively, the receiver 15 provides a receiver conversion signal on line 84 to the one-shot generator 82. In a manner similar to the one-shot generator 77, the one-shot generator 82 provides an RF and amplitude write pulse on line 86 in response to an increase in the amplitude level of the signal on line 84 to permit the receiver 15 to write the RF and amplitude of the detected signal pulse into the RF memory 56 and the amplitude memory 58 respectively at addresses determined by the counter 78 and corresponding to the address at which the TOA of the pulse was stored in the TOA memory 54. The comparator 98 is hard wired such that, when all the addresses of the TOA memory 54 have been filled, the maximum count signal is no longer provided on line 104. Without the presence of the maximum count signal on line 104, the AND gate 73 no longer provides an enable signal on line 75 or 76 and, therefore, no more TOA's are stored in the memory buffer 52. The maximum count signal provided on line 104 is extinguished so that the receiver 15 cannot write over received signal pulse parameters which have already been stored in the memory buffer 52 thereby resulting in unreliable received signal pulse data.

When the receiver 15 detects the TOA of a detected signal pulse but the detected pulse does not have the requisite RF and amplitude required by the threshold and RF control signals on lines 36 and 38, the one-shot generator 82 receives no receiver conversion signal on line 84 corresponding to the TOA receiver strobe signal on line 74 so that no RF and amplitude write pulse is generated by the one-shot generator 82. Therefore, no RF or amplitude information corresponding to the detected pulse is stored in the RF memory 56 or the amplitude memory 58 at the address corresponding to the address of the TOA memory 54 at which the TOA of that pulse is stored. Subsequently, when the central processing unit 12 addresses the TOA memory 54 to obtain this TOA value, it is also given the information that no suitable RF or amplitude information corresponding to this TOA was obtained by the receiver 15.

The central processing unit 12 obtains the TOA, RF and amplitude of the detected signals from the buffer memory 52 by providing a read signal on line 94 and an address signal on line 96 to the counter 78. The read and address signals from the central processing unit 12 cause the counter 78 to provide address and read signals on lines 88 and 90 which cause the TOA memory 54, the RF memory 56 and the amplitude memory 58 to provide the TOA, RF and amplitude of the particular detected signal pulse which is addressed on lines 68, 70 and 72 respectively. The receiver control 20, the receiver 15, the buffer memory 52, and the buffer memory control 66 thus far described in relation to FIG. 1 thus provide a means for detecting signals having selected TOA, RF and amplitude parameters that are within a predetermined range of values.

The detected signals which are detected by the receiver 15 and delivered through the memory buffer 52 to the central processing unit are sorted into detected threat signals comprised of phase coherent detected beams by comparison of the detected signals with the stored threats and stored beams in accordance with conventional threat signal acquisition techniques. These detected threat signals and detected beams may be established by any of several wellknown signal acquisition methods such as appropriately programming the central processing unit 12 with a sort routine. In general the TOA, RF and amplitude for each pulse of a detected signal, as stored in the buffer memory 52, is made available on lines 68, 70 and 72 to the central processing unit 12 which compares selected parameters of the signals detected by the receiver 15 and stored in the buffer memory 52 with the parameters of the stored beams which are considered to be exhibited by particular threats based on predetermined information to establish detected beams from the detected signals. The central processing unit 12 then detects threats by associating these detected beams with the stored threats that catalog the stored beams corresponding to the detected beams. Accordingly, the central processing unit 12 provides a means for detecting threat signals from the signals detected by the receiver 15 by comparing the detected signals with stored beams that are associated with stored threats to detect beams transmitted by the threat, and by detecting threat signals comprised of the detected beams where said detected threat signals correspond to the stored threat signals associated with the stored beams that are comparable to the detected beams.

The detected threat signals of phase coherent detected beams are provided by the central processing unit 12 to the multiplexed tracker 10 which is hereafter more fully described in relation to FIGS. 3 through 7. The multiplexed tracker 10 tracks the detected threat signals by making predictions as to the RF and PRI of the detected threat signals and providing an RF control signal to the receiver control 20 on line 18 and a window signal on line 40 to cause the receiver 15 to detect this threat signal as it is collected by the antenna 14. The TOA and RF of signals detected by the receiver 15 in response to the control signal are provided to the multiplexed tracker 10 which then corrects errors in its predictions as hereafter more fully explained in relation to FIGS. 3 through 9. The multiplexed tracker 10 therefore provides a means for controlling the detecting means in response to the detected threat signals of the central processing unit to cause the detecting means to detect threat signals in accordance with the stored beams of the central processing unit.

As was previously explained, the strobe signal of the receiver 15 is transmitted to the buffer memory control 66 to cause the storage of detected beam pulses in the buffer memory 52 in accordance with the foregoing description, provided the verify command network 105 is conductive. As shown in FIG. 1, the verify command network 105 includes an inverter 106, and AND gate 107, and AND gate 108, an OR gate 109, an inverter 110 and an AND gate 111. The inverter 106 is responsive to a verify command signal of the central processing unit 12 which provides the verify command signal when the disclosed tracking system verifies that tracking has been maintained on a particular threat signal. The AND gate 107 is responsive to the output of the inverter 106 and to the enable signal generator 28. The AND gate 108 is responsive to the verify command signal provided by central processing unit 12, and is also responsive to an inverter 110 which is responsive to a tracker prediction signal provided by the multiplexed tracker 10. The OR gate 109 is responsive to the outputs of the AND gates 107 and 108 and the AND gate 111 is responsive to the output of the OR gate 109 and the strobe signal of the receiver 15. The verify command network 105 will be conductive to the strobe signals of the receiver 15 whenever a signal is applied to the AND gate 111 from the OR gate 109. However, no signal will be applied to the AND gate 111 from the OR gate 109 unless the OR gate 109 receives an output signal either from the AND gate 107 or from the AND gate 108. The AND gate 107, which is responsive to the inverter 106, provides an output to the OR gate 109 whenever there is no verify command signal provided to the inverter 106 and there is an enable signal provided on line 40. The AND gate 108 provides an output to the OR gate 109 whenever there is a verify command signal from the central processing unit 12 and there is no tracker prediction signal provided by the multiplexed tracker 10. Therefore, the conduction of the strobe signal from the receiver 15 to the buffer memory control 66 is dependent upon the presence of the enable signal on line 40 in combination with the absence of a verify command signal from the central processing unit 12, or the presence of a verify command signal in combination with the absence of a tracker prediction signal from the multiplexed tracker 10.

In the regular operation of the disclosed tracker system, the central processing unit 12 operates on the premise that the multiplexed tracker 10 has continuously maintained track of a particular threat signal. Therefore, in the regular operation of the disclosed tracker system, no verify command signal will be provided by the central processing unit 12 to verify that the multiplexed tracker 10 has continuously maintained track of the same threat signal. When there is no verify command signal provided to the AND gate 108, the AND gate 108 will be non-conductive. In this normal mode of operation, therefore, the verify command network 105 will be non-conductive to the strobe signal of the receiver 15 unless the AND gate 107 is conductive. When no verify command signal is provided by the central processing unit 12, no signal is provided to the inverter 106 and the inverter provides a signal to the AND gate 107. The AND gate 107 then provides an output to the OR gate 109 whenever the enable signal is present on line 40. In response to an output from the AND gate 107, the OR gate 109 provides an output to the AND gate 111 which then provides an output to the buffer memory control 66 in response to a strobe signal from the receiver 15. Accordingly, whenever there is an enable signal in combination with the absence of a verify command signal, the verify command network 105 provides an output to the buffer memory control 66 in response to a strobe signal from the receiver 15, or, equivalently, the verify command network 15 is conductive to the strobe signal of the receiver 15.

When the central processing unit 12 determines that a verification should be performed as to whether the multiplexed tracker 10 has continuously maintained track of a particular threat signal, the central processing unit 12 provides a verify command signal to the inverter 106 so that no output is provided from the inverter 106 to the AND gate 107. Therefore, the verify command network 105 will be conductive to the strobe signals of the receiver 15 only if the verify command signal is provided to the AND gate 108 in combination with the absence of a tracker prediction signal from the multiplexed tracker 10. As will be explained more specifically in relation to FIGS. 3 and 5, the multiplexed tracker 10 will provide a tracker prediction signal to the AND gate 108 coincident with a verify command signal from the central processing unit 12 in combination with the prediction of a pulse in the threat signal by the multiplexed tracker 10. When the verify command signal is provided to the AND gate 108 in the absence of a tracker prediction signal from the multiplexed tracker 10 to the inverter 110, the AND gate 108 provides an output to the OR gate 109. In response to an output from the AND gate 108, the OR gate 109 provides an output to the AND gate 111 so that the AND gate 111 provides an output to the buffer memory control 66 in response to a strobe signal from the receiver 15. Equivalently, it can be said that the verify command network 105 is made conductive to the strobe signal of the receiver 15 in response to the verify command signal from the central processing unit 12 in the absence of a prediction signal from the multiplexed tracker 10.

Waveforms 2A and 2B of FIG. 2 illustrate two waveforms which may be considered to comprise typical examples of threat signals, each of which are known to be characteristic of a particular threat. Waveform 2A is comprised of the envelope of a radio frequency (RF) signal which has RF excursions at periodic intervals such that the envelope of the RF signal forms pulses of a predetermined width which occur at predictable times. The elapsed time between correlative points on successive pulses is generally referred to as the pulse repetition interval or PRI. Waveform 2B is also comprised of the envelope of a radio frequency signal (RF signal) which is similar to the waveform 2A with the exception that the pulse repetition interval (PRI) between successive pulses of the waveform is not always the same. However, the pulses of waveform 2B are phase coherent so that the pulse repetition interval (PRI) values between the successive pulses remain the same over the duration of the signal. Moreover, the pattern of the pulses of waveform 2B can be seen to repeat themselves over predetermined intervals which are generally referred to as cycle times. In the particular example of waveform 2B, a cycle time includes four successive, phase coherent pulses of the waveform so that an alternative way of considering waveform 2B is to consider it to be the linear combination of four, phase coherent pulse trains whose pulses are separated by one cycle time and whose phases are staggered by intervals equivalent to the pulse repetition intervals of the waveform 2B. In accordance with this description of the threat signal illustrated as the waveform 2B, the waveform may be referred to as a pulse waveform having four stagger levels or, equivalently, as a threat signal comprised of four beams. Referring to the threat signal illustrated as the waveform 2A, it will now be understood that the threat signal is comprised of a single stagger level, or equivalently, a single beam. The beam parameters which are of particular interest for the example of the preferred embodiment herein described are the PRI and RF of each beam. However, it will become apparent upon an understanding of the operation of the preferred embodiment, that the scope of the present invention extends to any particular threat signal parameter which, for example, could include the number of beams, scan type, or pulse doppler or continuous wave identification bits or any combination of such threat signal parameters.

The threat signals determined from the RF, TOA and amplitude information provided to the central processing unit 12 from the memory buffer 52 are tracked by the multiplexed signal tracker 10 described in FIGS. 3-9. The signal tracker 10 makes predictions as to the RF and PRI of received threat signals and provides corresponding control signals to the receiver control 20 to cause the receiver 15 to detect the threat signals if they, in fact, occur. The signal tracker of FIG. 3 tracks all phase coherent beams of a single threat signal provided at least one beam of the threat signal is present by maintaining all PRI values for multiple beam threat signals in a single memory associated with each threat signal. The order of access of the memory containing the PRI values is determined by a beam pointer whose time of access is controlled by a beam monitor which is operative with a particular address in a TOA memory that is associated with the threat signal that is being tracked.

Figure 3:
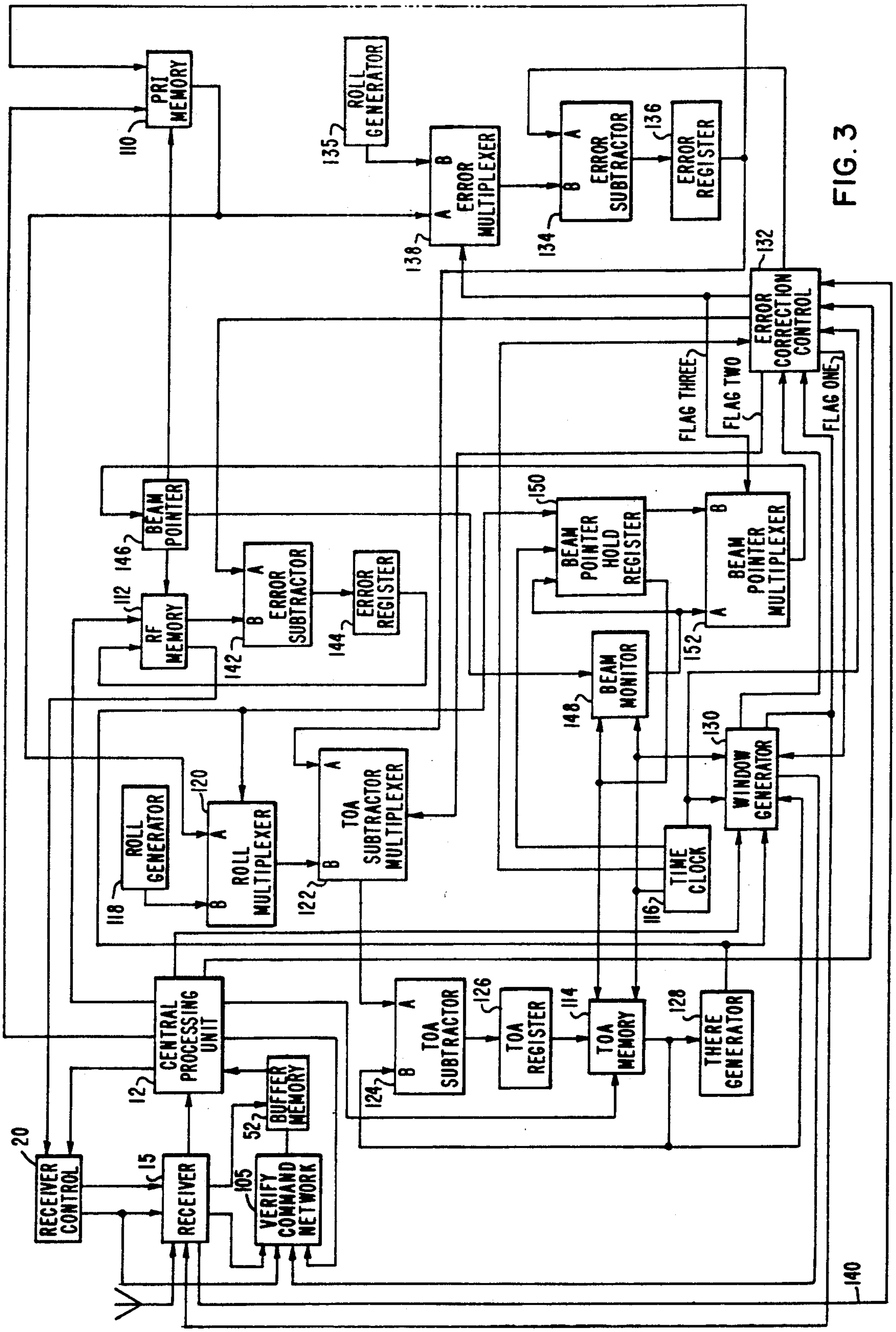
FIG. 3 is a more detailed block diagram of the multiplexed tracker of FIG. 1 which predicts the time of arrival of beam pulses at the receiver.

FIG. 3 shows a block diagram of the preferred embodiment of the multiplexed tracker 10, portions of which are further described in FIGS. 4, 5, 6, and 7. The detected threat signal which, for purposes of illustration, may be considered to be the pulse train shown in waveforms 2A and 2B of FIG. 2, are detected by the receiver 15 and delivered through the buffer memory 52 to the central processing unit 12 which establishes an initial PRI and phase condition for each of the phase coherent beams of the threat signal. For each beam of the threat signal, the central processing unit 12 stores an initial PRI value at a specified address in a PRI memory 110 and an initial RF value at a corresponding address in an RF memory 112. Simultaneously, the central processing unit 12 dedicates a tracker address in a TOA memory 114 to the threat signal and stores a value representing the predicted time of arrival (TOA) of the next pulse in the threat signal at this address. Therefore, the number of independent threat signals that can be tracked is limited only by the number of tracker addresses in the TOA memory 114 and the number of beams of a particular threat signal that can be tracked is limited only by the number of addresses in the PRI memory 110 and the RF memory 112 which are associated with a particular tracker address of the TOA memory 114.

The predicted time of arrival stored in the address of the TOA memory 114 is counted down by a means for counting toward the predicted time of arrival of pulses contained in all beams of a detected threat signal. The counting means includes the TOA memory 114, a time clock 116, a roll generator 118, a roll multiplexer 120, a TOA subtracter multiplexer 122, a TOA subtracter 124, and a TOA register 126. Each time the predicted time of arrival stored at the address of the TOA memory 114 that is dedicated to the detected threat signal is accessed by the time clock 116, the roll generator 118 delivers a signal, whose value is substantially equal to Δt, to terminal A of the TOA subtracter 124 through the roll multiplexer 120 and the subtracter multiplexer 122. The roll generator 118 may, in practice, be a hard wired bit of the roll multiplexer 120. The initial predicted time of arrival previously stored in the TOA memory 114 in accordance with the initial acquisition of the detected threat signal is provided to terminal B of the TOA subtracter 124, which then subtracts the value of the signal provided at terminal A from the value of the signal provided at terminal B to provide an output whose value is substantially equal to the value of the predicted time of arrival for the signal pulse decremented by an amount Δt. In the design of the roll generator 118, the value of Δt is made equal to one roll which is the real time which elapses between successive accesses of a single tracker address in the TOA memory 114 by the time clock 116 so that the predicted time of arrival of the next pulse of the signal is decremented in real time. The output of the TOA subtracter 124 is provided to the TOA register 126 which then delivers this value to the tracker address in the TOA memory 114. The next time the tracker address of the TOA memory 114 is accessed by the real time clock 116, this decremented value of the initial predicted TOA is again itself decremented by again subtracting from it a value equal to one roll in the TOA subtracter 124, as described above. This decrementing process continues until the value provided to the tracker address in the TOA memory 114 by the TOA register 126 is less than or equal to some predetermined value of time which will be identified as W/2.

When the predicted time of arrival stored in the tracker address of the TOA memory 114 has been counted down to the value of W/2, the value of the memory address is provided to a There generator 128 that causes the There generator 128 to provide a There signal which performs two functions. First, the There signal is provided as a control input to the roll multiplexer 120 to cause the roll multiplexer 120 to convey a predicted pulse repetition interval for the next pulse of the detected threat signal from the PRI memory 110 to terminal A of the TOA subtracter 124 through the subtracter multiplexer 122. This function provides for a variation in the predicted pulse repetition interval of the next pulse one example of which is illustrated by the waveform 9A which is hereafter discussed in relation to FIG. 9. Secondly, the There signal provided by There generator 128 is delivered to a window generator 130 that provides a window pulse which corresponds to the pulse of the detected threat signal which was predicted to arrive at the receiver 15 at time W/2 subsequent to the generation of the There signal. The There generator 128 and the window generator 130 are described later in further detail in FIGS. 4 and 5, respectively.

The window signal of the window generator 130 is provided to line 40 (FIG. 1) which provides the enable signal to the receiver 15 thereby enabling the receiver 15 to detect pulses corresponding to the amplitude and RF determined by the amplitude and RF control signals on the lines 36 and 38. The window signal is simultaneously provided to the error correction control 132 along with the signal pulses detected by receiver 15 and count signals from the time clock 116 to provide phase and pulse repetition interval error signals. In addition, the error correction control 132 provides flag signals which serve to control the multiplexing of phase corrections to be made to the predicted time of arrival stored in the TOA memory 114, pulse repetition interval corrections to be made to the predicted pulse repetition interval stored in the PRI memory 110, and RF corrections to be made to the predicted RF stored in the RF memory 112, as will be explained below.

Figure 6:
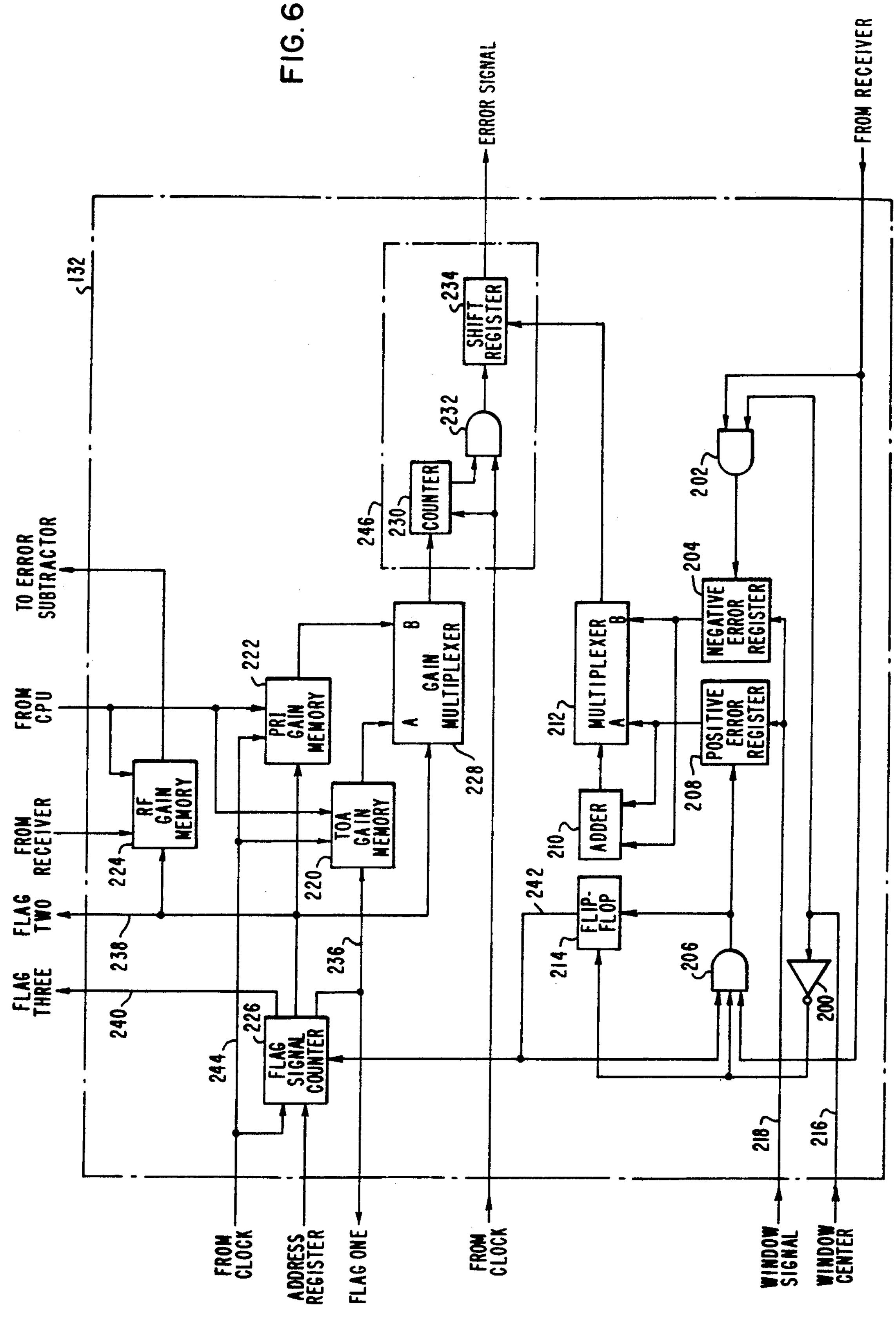
FIG. 6 is a more detailed block diagram of the error correction control shown in FIG. 3.

As will be further described in relation to FIG. 6, the error correction control 132 provides flag one, flag two, and flag three control signals. During the occurrence of the flag one control signal, the gain for the phase error of the predicted time of arrival is extracted from a memory element. Subsequent to this first flag signal and prior to a second flag signal, this phase error gain is binarily multiplied by the deviation of the predicted time of arrival from the actual time of arrival determined by error correction control 132 to provide the phase correction which is transferred to an error subtracter 134 for processing. The phase error signal of the error correction control 132 is provided to terminal A of the error subtracter 134. At this time, terminal B of the error subtracter 134 is provided with a value of Δt from a roll generator 135 through terminal B of an error multiplexer 138. In a fashion similar to the TOA subtracter 124, the error subtracter 134 computes the difference between the value of one roll determined by the roll generator 135 and the deviation between the predicted time of arrival and the actual time of arrival determined by the error correction control 132. This difference is provided to an error register 136 and, upon the occurrence of a flag two control signal provided by the error correction control 132 to the subtracter multiplexer 122, the difference is then multiplexed through the TOA subtracter multiplexer 122 into terminal A of the TOA subtracter 124 to correct the phase of the predicted time of arrival. As is well known in the art, the subtracter multiplexer 122 is conjunctive in its nature in that it can produce at its output only signals provided to either terminals B or A, depending upon the absence or presence of a flag two control signal respectively. Although the predicted time of arrival value for the signal pulse must be continuously counted down in order to maintain coherence with real time, the one roll value of the roll generator 118 could not be introduced through the roll multiplexer 120 into the TOA subtractor 122 at the same time that the correction for the phase was made. Therefore, it will be appreciated that the roll generator 135 is necessary to subtract the Δt value of one roll from the error determined by the error correction control 132 prior to the application of the error signal to terminal A of the subtracter multiplexer 122.

During the occurrence of the flag two signal, the gain for the pulse repetition interval error is extracted from a memory element in the error correction control 132. Subsequent to the occurrence of the flag two signal and prior to the flag three signal, the pulse repetition interval error gain is multiplied by the deviation of the predicted time of arrival from the actual time of arrival determined for the pulse repetition interval by the error correction control 132. As with the error for the phase of the predicted time of arrival, the error for the pulse repetition interval for the predicted time of arrival is provided to the error subtracter 134 to determine the necessary corrections for the pulse repetition interval value stored in the PRI memory 110. This correction is accomplished by providing the flag three signal to the error multiplexer 138 causing the output of the error multiplexer 138 to provide the value supplied to its A terminal from the memory address of the PRI memory 110 so that the error subtracter 134 subtracts the error determined for the PRI by the error correction control 132 from the former PRI value stored at the address of the PRI memory 110. This new PRI value is provided to the error register 136 and is then returned to the appropriate address in the PRI memory 110 from which it may be called to predict the time of arrival for the next pulse of the beam for which it is predicting.

The RF of the pulse of the beam is corrected simultaneously with the PRI of the pulse. During the occurrence of the flag two control signal of the error correction control 132, the gain of the RF error of the predicted TOA is extracted from a memory element included in the error correction control 132. Subsequent to this second flag signal and prior to a third flag signal, the RF error gain is binarily multiplied by the deviation of the predicted RF from the actual RF determined by the receiver 15 and provided to the error correction control 132 on the line 140. The product of the RF gain and the RF error signal which provides the RF correction is transferred to an error subtracter 142 for processing. The RF error signal of the error correction control 132 is provided to terminal A of the error subtracter 142. At the same time, the error subtracter 142 is provided with the former RF value of the RF memory 112 so that, in a manner analogous to the error subtracter 134, the error subtracter 142 subtracts the error determined for the RF by the error correction control 132 from the former RF value stored at the address of the RF memory 112. This new RF value is provided to the RF error register 144 and is then returned to the appropriate address in the RF memory 112 from which it may be called to predict the RF for the next pulse of the beam for which it is predicting.

From the explanation made with regard to FIGS. 1, 2 and 3, it can be seen that, where threat signals having multiple beams are to be tracked by a single tracker, a means must be provided for storing the various PRI values, establishing their order of succession, and monitoring their position. The means for storing an arbitrary number of PRI values which correspond to a single tracker includes the PRI memory 110 while the means for establishing their order of succession and monitoring their position includes the beam pointer 146 and beam monitor 148 respectively. For each tracker address in the TOA memory 114, the PRI memory 110 and the RF memory 112 are provided with a number of addresses sufficient to accommodate the highest number of beams which are to be tracked by the corresponding tracker. Corresponding to each address in the PRI memory 110 and the RF memory 112 is an address in the beam pointer 146 which is also comprised of a memory unit. Where the succession of the examination of the beams of the tracker is to remain in a fixed relation, the beam pointer 146 may be comprised of a read only memory having predetermined fixed values for each memory address. Where additional flexibility is required, the beam pointer 146 may be comprised of a read-write memory so that the order of succession of PRI addresses in the PRI memory 110 and RF memory 112 may be changed by writing into the beam pointer 146. Corresponding to each tracker address in the TOA memory 114 is an address in the beam monitor 148 which is also comprised of a memory element. Since the beam monitor 148 must have the capability of successively storing the values at the addresses of the beam pointer 146, the beam monitor 148 must be a memory of the read-write variety. Each address in the beam monitor 148 corresponds to a tracker address in the TOA memory 114 and is accessed at the same time as the corresponding tracker memory address by the time clock 116 so that each time the TOA memory 114 is accessed, the PRI address from the PRI memory 110 and the RF address from the RF memory 112 are selected in the following manner.

On a write signal provided by a beam pointer hold register 150 to the TOA memory 114 and the beam monitor 148, the information contained at the address of the beam pointer 146 that corresponds to the address of the PRI memory 110 which is currently accessed, is written into the beam monitor 148 at the address corresponding to the tracker address of the TOA memory 114. This information remains at this address of the beam monitor 148 until the monitor address is accessed by the clock 116 at which time the value which had been written in by the beam pointer 146 is transferred to terminal A of a beam pointer multiplexer 152 and provided as the output of the beam pointer multiplexer 152 to the addresses of the PRI memory 110, the RF memory 112, and the beam pointer 146 in which it is used to select the next address of the PRI memory 110 and the RF memory 112. The information of the beam pointer 146 associated with this next address is then written into the address of the beam monitor 148 associated with the tracker address of the TOA memory 114 currently accessed by the time clock 116 so that the process continues upon each access of the addresses of the TOA memory 114 and the beam monitor 148 by the time clock 116. It will be seen that, if the values in the addresses of the beam pointer 146 associated with each address in the PRI memory 110 and the RF memory 112 are the next addresses of the PRI memory 110 and the RF memory 112 which are desired, the beam pointer 146 will cooperate with the address in the beam monitor 148 associated with the tracker address in the TOA memory 114 to provide the proper order of succession in which the beams will be examined. It can be seen from the above discussion that the beam pointer 146 controls the next address of the PRI memory 110 and the RF memory 112 through the address of the beam monitor 148 associated with the TOA memory 114.

As an illustration of the selection of addresses of the PRI memory 110 and the RF memory 112 through the beam pointer 146 and the beam monitor 148, consider the table shown as follows:

| INITIAL VALUES | | | |
|---|---|---|---|
| BEAM POINTER | | BEAM MONITOR | |
| ADDRESS | INFORMATION WORD | ADDRESS | INFORMATION WORD |
| 0000 | 0 0 0 1 | 0000 | 0 0 0 1 |
| 0001 | 0 0 1 0 | | |
| 0010 | 0 0 1 1 | | |
| 0011 | 0 0 0 0 | | |

| SEQUENCE OF VALUES IN BEAM MONITOR | | | | |
|---|---|---|---|---|
| ACCESS TO BEAM MONITOR ADDRESS | BEAM MONITOR INFORMATION WORD | | | |
| FIRST THERE | 0 | 0 | 1 | 0 |
| SECOND THERE | 0 | 0 | 1 | 1 |
| THIRD THERE | 0 | 0 | 0 | 0 |
| FOURTH THERE | 0 | 0 | 0 | 1 |

In the case of the above table, the particular tracker is to track a pulse train having a four level stagger. As explained previously, this pulse train can equivalently be considered as a threat signal comprised of four phase coherent beams. Therefore, the PRI memory 110, the RF memory 112 and the beam pointer 146 must have at least four addresses corresponding to the tracker address of the TOA memory 114 which is dedicated to tracking this threat signal. The initial condition considered in the closed loop of the table shows that the address of the beam monitor 148 associated with the tracker address of the TOA memory 114 contains a digital one so that the beam monitor 148 is pointing to the address one of the PRI memory 110, the RF memory 112 and the beam pointer 146. The table also shows that associated with the one address of the beam pointer 146 is an information word having a value of a digital two. When the next There signal is provided to the roll multiplexer 120, the PRI memory address which is accessed in the PRI memory 110 and the RF memory address which is accessed in the RF memory 112 are determined by the digital number written into the address of the beam monitor 148 corresponding to the tracker address in the TOA memory 114. In the illustration of the table, the beam pointer 146 had written into the beam monitor 148 a digital one so that the next PRI and RF values selected would be the values located at the "one" address of the PRI memory 110 and the RF memory 112. At the same time, the address in the beam pointer 146 corresponding to the one address in the PRI memory 110 and the RF memory 112 contains a digital two which is written into the beam monitor 148 at the address corresponding to the tracker address of the TOA memory 114. The next time a There signal is provided to the roll multiplexer 120, the address of the beam monitor 148 corresponding to the tracker address of the TOA memory 114 indicates that the PRI and RF values stored at the digital "two" locations of the PRI memory 110 and the RF memory 112 should be used. At the same time, the address in the beam pointer 146 corresponding to the digital two address in the PRI memory 110 and the RF memory 112 contains a third value, a digital three which is written into the address of the beam monitor 148 corresponding to the tracker address of TOA memory 114. In the same manner as before, when this predicted time of arrival has been counted down to the W/2 value and a There signal is provided to the roll multiplexer 120 so the next PRI value is called from the PRI memory 110 and the next RF value is called from the RF memory 112, the value provided will be that stored at the digital three address of the PRI memory 110 and the RF memory 112 respectively. The address of the beam pointer 146 corresponding to the digital three address of the PRI memory 110 and the RF memory 112 has a value of digital zero which is then written into the address of the beam monitor 148 corresponding to the tracker address in the TOA memory 114 to initiate the next round of the above-described cycle.

As was explained previously, corrections in the values stored at the PRI addresses of the PRI memory 110 are made by the error loop which includes the error correction control 132, the roll generator 135, the error multiplexer 138, the error subtracter 134 and the error register 136. It will be appreciated that, once this error in the PRI value is determined, this corrected PRI value must be returned to the proper address of the PRI memory 110 to maintain the correct sequence in the order of succession of PRI values between the pulses of successive beams. For this purpose, the disclosed apparatus is provided with the beam pointer hold register 150 and the beam pointer multiplexer 152. The beam pointer hold register 150 retains the address of the prior PRI memory value and the prior RF memory value which had been contained in the beam monitor 148, until such time as the PRI and RF corrections can be made. The pointer hold register 150 is further described in relation to FIG. 7. When the corrected PRI and RF values are to be entered in the PRI memory 110 and the RF memory 112 respectively, the appropriate address of PRI memory 110 and the RF memory 112 are multiplexed to the memories through terminal B of the beam pointer multiplexer 152 by applying the flag three signal to the beam pointer multiplexer 152.

FIG. 3 also shows that, by operating the real time clock 116 at a faster counting rate than is necessary to decrement a single tracker, and by expanding the number of addresses in the TOA memory 114 and the beam monitor 148 to accommodate the number of threats which are to be tracked, and by expanding the address dimensions of the PRI memory 110, the RF memory 112 and the beam pointer 146 to accommodate the increased number of trackers, basic multiplexing techniques can be used to provide a tracker capable of tracking an arbitrary number of threats while, except for the above-described expanded memory capabilities, requiring only the hardware necessary for a tracker which tracks single threats. As a specific example, if the disclosed tracker were to have the capability of tracking sixteen threats, the real time clock 116 would be multiplexed among sixteen addresses of the TOA memory 114 and the beam monitor 148. Further, if the tracker were to have the capability of tracking threats which included as many as four beams, the PRI memory 110, the RF memory 112, and the beam pointer 146 would be comprised of memory elements having a total of sixty four (16×4) addresses.

It will be appreciated that in an environment which is densely populated with microwave signals comprising threat signals such as described herein, it is highly probable that the pulses of two or more of these threat signals may occur simultaneously. For a multiplexed tracker, such as the one described in relation to FIG. 3, which is simultaneously tracking a multiple of threat signals by making TOA, PRI and RF predictions for the various threat signals on a time-sharing basis, it is necessary to have the capability of determining which threat signal should be tracked when the pulses of the threat signals simultaneously occur. Therefore, as more fully described in relation to FIG. 5, the window generator 130 of the multiplexed tracker includes the tracker priority logic 168 which determines the order in which the tracker addresses of the TOA memory 114 which are competing for a window signal, will obtain a window signal output from the window generator 130 in response to a There signal from the There generator 128. Briefly, each tracker address of the TOA memory 114 is associated with a priority number in the tracker priority logic 168. This priority number is established in relation to the frequency with which the tracker address has been unable to obtain a window in response to a There signal. Specifically, whenever a There signal occurs in relation to a tracker, the priority count of that tracker is incremented by a digital one. If the tracker obtains a window signal, the priority count is returned to zero at the completion of the window signal.

If more than one tracker should need a window at the same time, a priority comparison is made to determine which tracker should have the window. The tracker having the highest priority is given the window signal. If the tracker which had the window signal first has the highest priority, it will retain the window, but if the tracker that attempts to obtain a window signal subsequent in time has the highest priority, the subsequent tracker will be given a window and the first tracker will be "bumped" out of its window. When the tracker is unable to complete a window signal, either because the tracker could not obtain a window signal or because the tracker was bumped out of its window by another tracker having higher priority, the tracker priority is saved until the next There signal occurs and a digital one is added to the priority number which was preserved. If the tracker is again competing with another tracker for the window, the new, higher priority will be compared to the priority of the other tracker to determine which tracker will have the window. If the tracker obtains the window and is able to complete the window, the priority will be returned to zero, but if the tracker is competing with another tracker having a higher priority and is therefore either unable to obtain a window or is unable to complete the window it has obtained, the tracker priority is again saved and is incremented by a digital one upon the occurrence of the next There signal associated with the tracker. Since the trackers which are able to obtain and complete their windows have their priorities returned to zero, the tracker will eventually have a higher priority than any of the other trackers with which it is competing for the window and will, therefore, obtain and complete the window. As will be explained in more detail in relation to FIG. 5, the tracker that is tracking a threat signal which is being verified will always be given priority over other trackers so that a reliable tracker verification operation can be performed.

Figure 4:
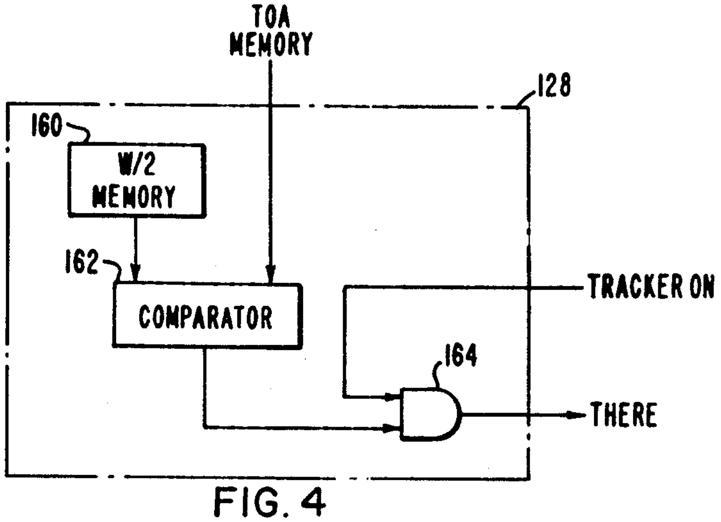
FIG. 4 is a more detailed block diagram of the There generator shown in FIG. 3.

FIG. 4 shows a more detailed block diagram of the There generator 128 shown in FIG. 3 and includes a W/2 memory 160, a comparator 162 and an AND gate 164. The predicted time of arrival provided by the TOA memory 114 is compared with a W/2 value provided by the W/2 memory 160 in the comparator 162 which provides an output whenever W/2 is greater than or equal to the predicted time of arrival value. The output of the comparator 162 comprises the input necessary to produce a signal at the output of the AND gate 164 which constitutes the There signal when the central processing unit 12 indicates that the tracker has been turned on.

Figure 5:
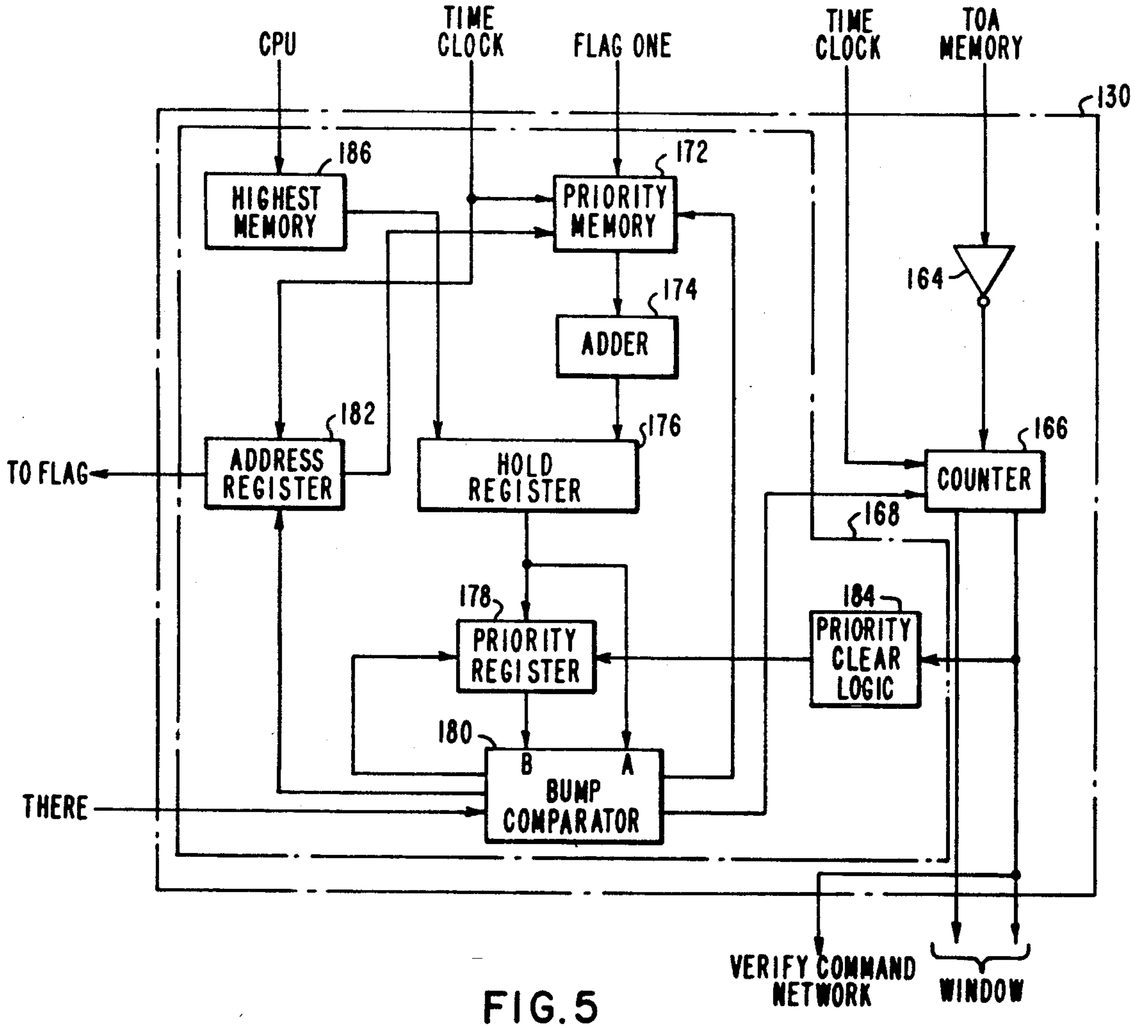
FIG. 5 is a more detailed block diagram of the window generator shown in FIG. 3.

FIG. 5 shows in greater detail the window generator 130 which was previously shown in FIG. 3 and includes an inverter 164, a counter 166 and the tracker priority logic 168. When the inverter 164 is provided with the output TOA value of the TOA memory 114 (FIG. 3) and when the window counter 166 is provided with a prediction signal from the tracker priority logic 168 and a clock signal from the clock 116 (FIG. 3), the window signal is provided at the output of the counter 166. The window counter 166 begins to count at a value substantially equal to W/2 less than zero upon receiving a prediction signal from the tracker priority logic to open the window and continues to count through zero to a value substantially equal to W/2 greater than zero at which point the counter 166 stops counting, thereby closing the window. The most significant bit of the counter 166 provides the tracker prediction signal to the verify command network 105 in response to the inputs from the TOA memory 114, the tracker priority logic 168, and the clock 116.

The tracker priority logic 168 which controls the priority of access of the tracker addresses of the TOA memory 114 to the window generator 130 includes a priority memory 172, an adder 174, a hold register 176, a priority register 178, a bump comparator 180, an address register 182, priority clear logic 184, and a highest memory 186. The priority memory 172 is responsive to the tracker address signal from the time clock 116 (FIG. 3) such that when the address signal is applied to the priority memory 172, the priority value stored in the priority memory 172 at the address determined by the address signal from the time clock 116 is provided to the adder 174 where a digital one is added to the priority value formerly stored in the priority memory 172. The sum which is determined by the adder 174 is provided to the hold register 176 where it is temporarily stored. Initially, the priority register 178 is provided with a zero value from the priority clear logic 184 in response to the close of the previous window signal as will be more fully explained hereafter. A There signal corresponding to the tracker which was addressed by the time clock 116 is applied to the bump comparator 180 which then compares the priority value of the hold register 176 to the priority value of the priority register 178. If the priority value of the hold register 176 is larger than the priority value of the priority register 178, the There signal causes the bump comparator 180 to provide a prediction signal to the counter 166 which then begins counting out the window signal. Additionally, the magnitude and address of the priority value are stored in the priority register 178 and the address register 182 respectively. Since the value stored in the priority register 178 by the priority clear logic at the close of a window signal is zero, the first tracker to request a window by providing a There signal after the window has closed will get the window. Furthermore, if no other trackers request a window before the window of the first tracker is completed, the first tracker will also complete the window. However, if there are other trackers which are competing with the first tracker for the window signal, whether the first tracker will complete the window signal will depend upon its having at least as high a priority as all the other trackers with which it is competing. As long as the value of the first tracker is at least as high as the priority value of the other competing trackers, the value applied to terminal A of the bump comparator 180 will be less than or equal to the value applied to terminal B of the bump comparator 180 and the value applied to terminal A will be written into the priority memory 172 at the address of the subsequent tracker, thereby increasing the value of the priority number for that tracker. Therefore, the next time that the tracker requests a window signal, it will obtain the window signal unless it is still competing with other trackers which have priority values that are at least as large as its own. If, in this case, the tracker still does not get the window, its priority will again be increased so that it will have an even higher priority the next time it requests a window signal. Eventually, therefore, the priority of the tracker will be incremented to the point where it has sufficient priority to obtain and complete a window signal.

When a tracker has a higher priority than the tracker which already has a window signal in response to a There signal, the tracker with the higher priority will preempt or "bump" the tracker with the lower priority from the use of the window. In this situation the priority value applied to the "A" terminal of the bump comparator 180 will exceed the priority value applied to the "B" terminal of the bump comparator 180, as in the case of the first tracker to request a window after the close of the preceding window signal as was referred to earlier. When the priority value applied to terminal "A" exceeds the priority value applied to terminal "B", the bump comparator 180 provides the magnitude of the priority value for the new tracker to the priority register 178 and also provides the address for the tracker associated with this priority to the address register 182.

At the same time that the magnitude of the new priority is provided to the priority register 178 and the address of the tracker associated with this magnitude is provided to the address register 182, the priority of the prior tracker which was provided to terminal B is returned to the priority memory 172 where it is stored at the address provided by the address register 182 until the tracker is again accessed by the time clock 116. In this manner, the priority values of trackers which did not get a window signal in response to a There signal and the priority values of trackers which obtained a window signal but were pre empted, or bumped, by a tracker having a higher priority are preserved in the priority memory 172. Since the priority values are incremented each time that they are accessed by the time clock 116, the tracker priority will continue to increase until the tracker is able to obtain and complete a window.

When the window for a tracker is obtained and completed, the priority clear logic 184, which is responsive to the output of the counter 166, clears the magnitude of the priority for that tracker to zero. The priority clear logic can be comprised of a memory element which is responsive to the most significant bit of the counter 166. Since the priority value in the priority register 178 is cleared to zero at the end of the window, and since the priority value applied to terminal A of the comparator 180 is always at least one due to the operation of the adder 174, as between trackers competing for a window, the first tracker requesting a window after the completion of a window by another tracker will bump the tracker which last completed a window from the priority register 178. In response to the time clock 116, the address register 182 provides an input to the flag signal counter of the error correction control 132. In response to this input, the flag signal counter of the error correction control provides the flag one signal to the priority memory 172 which records the priority value for the tracker as zero.

The tracker priority logic 168 also includes a highest memory 186 which is responsive to the tracker verification signal of the central processing unit 12 to provide overriding priority to the tracker which is tracking a threat signal which is being verified. During the tracker verification operation, the central processing unit 12 provides a continuous tracker verification signal to the highest memory 186. In response to the tracker verification signal from the central processing unit 12, the highest memory 186 sets the most significant bit in the hold register 176 such that priority value for this tracker is higher than any priority value which can be obtained from the priority memory 172 in the normal operation of the tracker priority logic 168. Thereafter, the tracker priority logic 168 operates such that the priority of the tracker that is tracking the threat signal being verified will always be the highest priority among trackers and, therefore, the tracker that is tracking the threat signal that is being verified will always get a window in response to a There signal while other trackers will not get a window while the tracker verification signal is present.

The priority clear logic 184 also provides the tracker prediction signal to the verify command network 105 in response to the most significant bit of the counter 166. The tracker prediction signal provides a pulse in response to the pulse which the threat signal is predicted to have but provides no pulses in response to other threat signals being tracked due to the overriding priority of the highest memory 186.

FIG. 6 shows a more detailed block diagram of the error correction control 132 shown in FIG. 3. As explained in relation to FIG. 3, the error correction control 132 determines the error between the pulse occurring closest to the center of the window signal provided by window generator 130 and determines a correction for the phase, PRI and RF of the predicted time of arrival for the beam by multiplying this error by the phase, RF and PRI gains stored in a memory. The error correction control 132 also generates appropriate flag signals for multiplexing the phase, PRI and RF corrections into the TOA memory 114, the PRI memory 110 and the RF memory 112 respectively. The portion of that error correction control 132 which determines the pulse occurring closest to the center of the window signal provided by the window generator 130 includes an inverter 200, an AND gate 202, a negative error register 204, an AND gate 206, a positive error register 208, an adder 210, a multiplexer 212, and a flip-flop 214.

The window signal from the window generator 130 is provided to the error correction control 132 on lines 216 and 218, the signal on line 216 being responsive to the state of the most significant bit of the counter 166 (FIG. 5) so that the signal on line 216 is indicative of the center of the window signal. When the counter 166 of the window generator 130 begins counting, the signal on line 216 enables pulses detected by the receiver 15 to pass through the AND gate 202 and gate the pulse count of the counter 166 into the negative error register 204. Subsequent pulses from the receiver 15 will similarly gate the count value of the counter 166 into the negative error register 204 until the signal on line 216 indicates that the counter has passed the center of the window signal. Therefore, the value in the negative error register 204 is the value corresponding to the number of counts made by the counter 166 between the last beam pulse received by the receiver 15 and the center of the window signal. When the counter 166 has crossed the center of the window, the signal on line 216 will then operate through the inverter 200 to enable the first pulse detected by the receiver 15 to pass through the AND gate 206 to gate the value of the counter 166 into the positive error register 208. A signal passing through the AND gate 206 also causes the flip-flop 214 to change state so that no subsequent pulses can pass through the AND gate 206 until the flip-flop 214 is reset by the termination of the window pulse. The contents of the negative error register 204 and the positive error register 208 are added in the binary adder 210 which causes the output of the multiplexer 212 to be provided from terminal "A" if the sign of the sum is positive, and which causes the output of the multiplexer 212 to be provided from terminal "B" if the sign of the sum is negative.

The apparatus for providing corrections for the phase, PRI and RF of the predicted time of arrival includes a TOA gain memory 220, a PRI gain memory 222, an RF gain memory 224, flag signal counter 226, a gain multiplexer 228, a counter 230, an AND gate 232 and a shift register 234.

The control signals flag one, flag two, and flag three, which have been previously referred to, are provided on lines 236, 238 and 240, respectively, in response to signals provided by the clock 116 and the output of the flip-flop 214 on line 242 which indicates the detection of a pulse in the positive half of the window or which indicates the end of a window if no pulses were detected by receiver 15 during the positive half of the window. The gain for the phase error is provided by the TOA gain memory 220 in response to a signal from clock 116 on line 244 and in response to the flag one signal on line 236, and passes through the gain multiplexer 228 in the absence of a flag two signal from the flag signal counter 226. The gain for the pulse repetition interval is provided by the PRI gain memory 222 in response to a signal from the clock 116 on line 244 and in response to a flag two signal on line 238, and passes through the gain multiplexer 228 with the presence of a flag two signal on line 238. The error gains provided by the TOA gain memory 220 and by the PRI gain memory 222 through the gain multiplexer 228 are multiplied by the deviation of the predicted TOA from the actual TOA by the binary multiplier 246. The binary multiplier 246 includes counter 230, the AND gate 232 and the shift register 234, combined as shown in FIG. 6 in a manner well known to those skilled in the pertinent art. The RF gain memory 224 is responsive to the flag two signal and is also responsive to the RF of the detected pulse to provide the corrected RF for the RF memory 112. The corrected RF is provided to the RF memory 112 in response to the application of the flag two signal to the RF gain memory 224.

Figure 7:
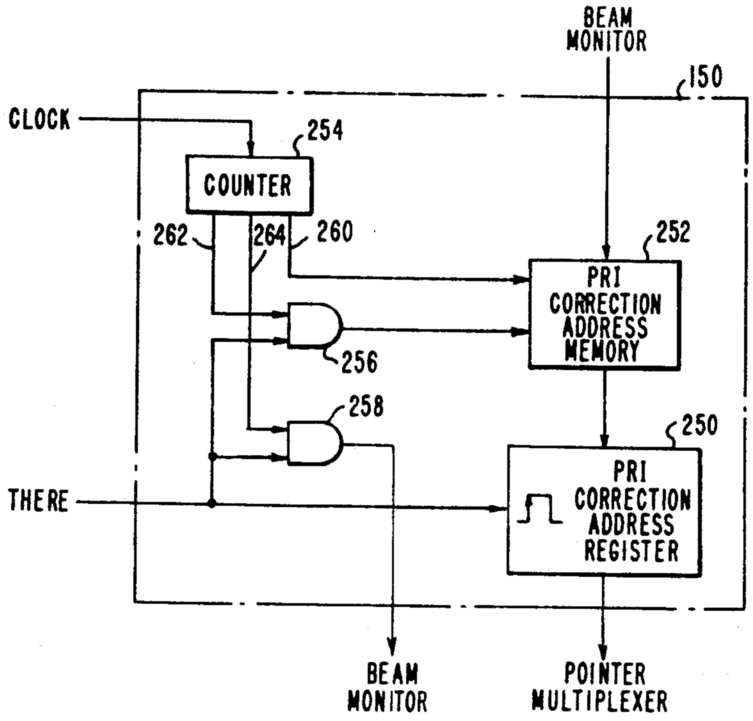
FIG. 7 is a more detailed block diagram of the pointer hold register shown in FIG. 3.

The beam pointer hold register 150 which is shown in FIG. 3 is further described in FIG. 7 and includes a PRI correction address register 250, a PRI correction address memory 252, a counter 254, an AND gate 256, and an AND gate 258. As explained previously, the pointer hold register 150 retains the values of the prior information word stored in the beam monitor 148 after the monitor has, for each tracker address of the TOA memory 114, been written into by the beam pointer 146 on the occurrence of a There signal.

In response to the clock 116, the counter 254 first provides an address signal on line 260 to the PRI correction address memory 252 while the information word which is to be retained is contained in the beam monitor 148. Next, the counter 254 provides a second signal on line 262 which cooperates with a There signal provided by the There generator 128 to provide a write pulse at the output of the AND gate 256 to latch the information of the beam monitor 148 into the PRI correction address memory 252. Then, after the termination of the second signal, the counter 254 provides a third signal on line 264 which cooperates with the There signal provided by the There generator 128 to provide a write pulse at the output of the AND gate 258 to latch the information of the beam pointer 146 into the beam monitor 148. However, the prior information word of the beam monitor 148 is still contained in the PRI correction address memory 252 and is available to be brought into the PRI correction address register 250 on the rising edge of the next There signal of the There generator 128. In this manner, the information word contained in the PRI correction address register 250 provides the proper address of the PRI and RF values of the PRI memory 110 and the RF memory 112 which are to be corrected by the error correction loop.

Figure 8:
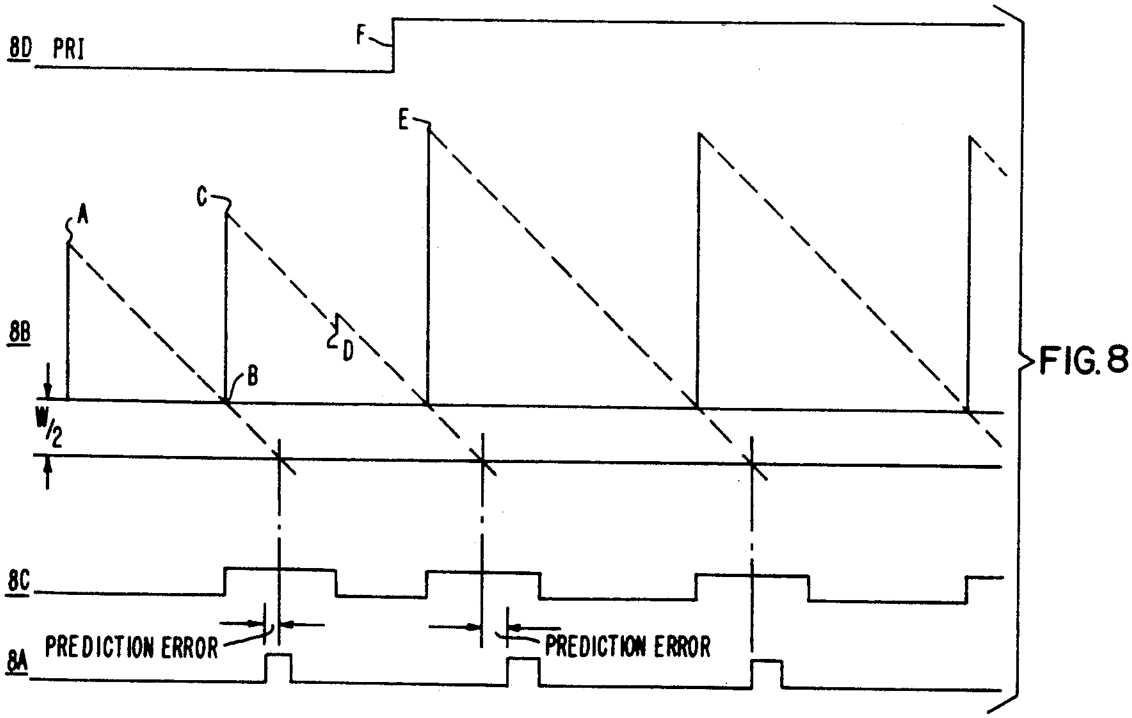
FIG. 8 illustrates the operation of the signal tracker of FIG. 1 and FIGS. 3 through 7 while tracking a pulse train of a single beam.

The operation of the disclosed multiplexed phase coherent signal tracker of the preferred embodiment which is shown in FIGS. 3 through 7 is illustrated generally in FIG. 8 for the example of the disclosed tracker tracking the single beam waveform 2A of FIG. 2. Although the disclosed tracker is capable of tracking a threat which exhibits an arbitrary number of beams, the operation of the multiplexed tracker will be easier to comprehend by first using the example of a threat signal having a single beam. In FIG. 8, the vertical axis represents the predicted time of arrival of the pulse of waveform 2A which has been redrawn in FIG. 8 as the waveform 8A. The horizontal axis of FIG. 8 represents real time. Initially, the tracker is provided with PRI and RF values by signal acquisition methods previously described in relation to FIG. 1. The initial PRI is periodically decremented by a predetermined discrete value of time $\Delta t$ to count toward the predicted time of arrival of the next pulse in the beam. As illustrated in FIG. 8, the initial PRI is decremented from point A and continues to be decremented to point B as indicated generally by the dashed line. At point B, the tracker provides a window signal shown as the waveform 8C during which the pulse which was predicted at point A will be anticipated by the receiver 15. As indicated at point B, the pulse of the window signal 8C is generated when the predicted time of arrival reaches a value which is essentially equal to one-half the pulse-width of the window signal pulse. This is indicated in FIG. 8 by showing point B to be set at W/2, an arbitrary but predetermined value above the real time ordinate. At the same time that the tracker generates the window signal pulse as shown in waveform 8C, the tracker begins counting down the predicted time of arrival for the next pulse of the threat signal which, in the example of FIG. 8, is shown as point C. If a pulse of the threat signal is not found to be within the pulse-width of the previous pulse of the window signal waveform, the predicted TOA will continue to be steadily decremented by discrete amounts of $\Delta t$ until the TOA again reaches a W/2 value at which time the tracker's initially predicted TOA for the next pulse of the threat signal will again be restored. If, however, as illustrated in FIG. 8, a pulse of the threat signal does occur within the pulse-width of the previous pulse of the window signal waveform 8C, a predetermined point on the threat signal pulse, as for example, the leading edge of the pulse, is compared with the predicted TOA. The deviation between the predicted TOA and the arrival of the predetermined point on the pulse which, in our example, is the leading edge, are used to determine error signals which correct the phase and PRI values during the subsequent round of decrementing the predicted TOA. The effect of the correction for a phase error is shown in FIG. 8 at line D while the effect of a correction for a PRI error is shown from a comparison of the PRI values of points C and E. The effect of a correction of a PRI error is also shown at line F of waveform 8D which represents the relative PRI values of the tracker before and after the PRI correction is made at point E.

Figure 9:
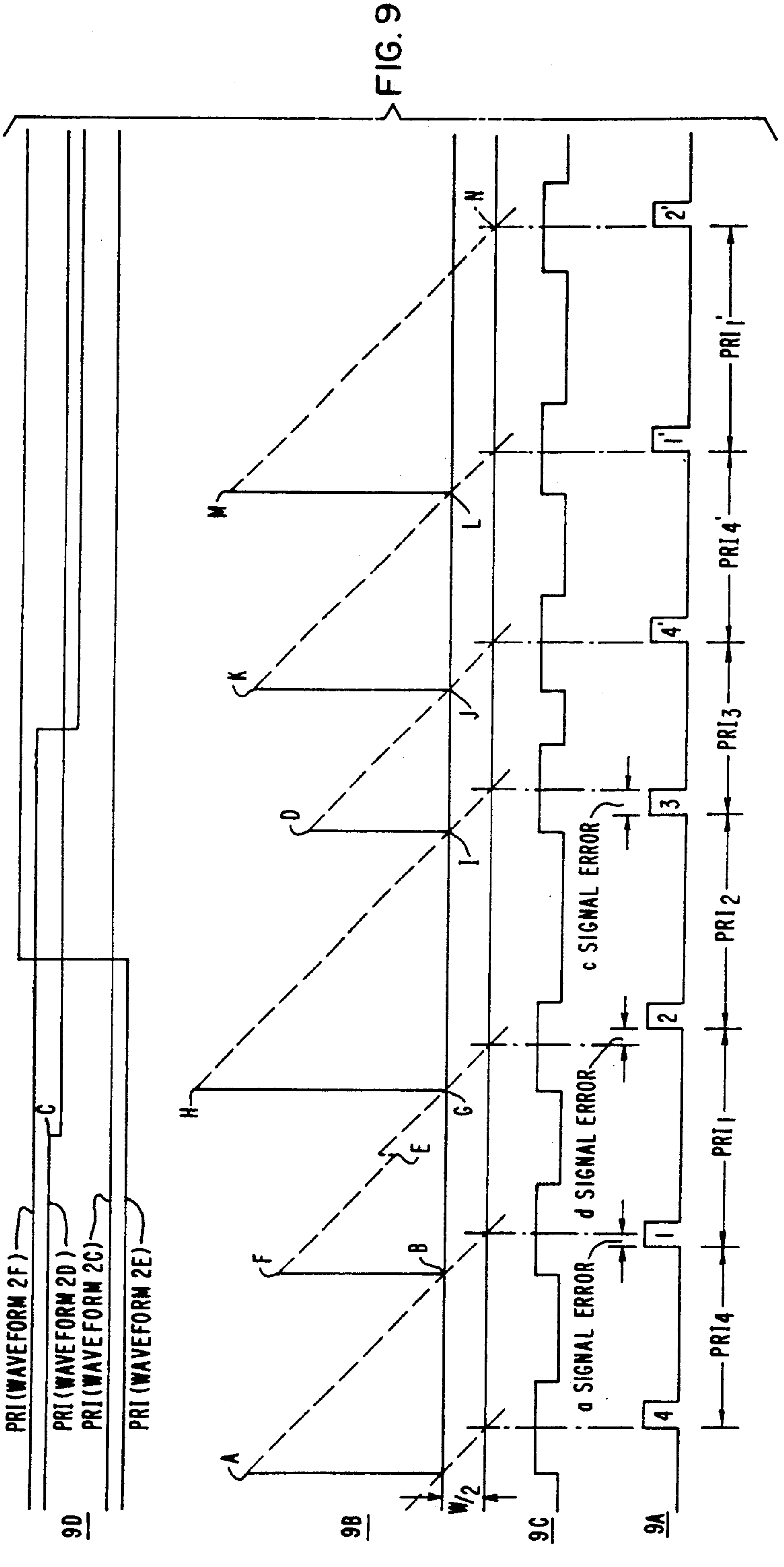
FIG. 9 illustrates the operation of the signal tracker of FIG. 1 and FIGS. 3 through 7 while tracking a pulse train having multiple beams.

The preferred embodiment of the described tracker has capabilities which transcend the requirements of a single beam threat signal. FIG. 9 illustrates the operation of the disclosed multiplexed tracker in predicting the time of arrival and RF of the four beam threat signal illustrated as waveform 2B of FIG. 2. The four beam threat signal of the waveform 2B has been redrawn in FIG. 9 as waveform 9A. As explained previously, the beams are staggered by the pulse repetition intervals $PRI_1$, $PRI_2$, $PRI_3$, and $PRI_4$. Since the beams are phase coherent, they do not shift with respect to each other but maintain their phase relationship through the progression of time. Although some values of the PRI's of the threat signal of waveform 9A are equal, this need not necessarily be the case. Persons skilled in the pertinent art generally refer to such a threat signal as having a four level stagger to indicate the number of phase coherent beams having distinct PRI and RF values which comprise the threat signal. As was the case with FIG. 8, well-known tracker acquisition apparatus and methods are used to initially determine the phase, PRI and RF relationship of the four beam threat signal of waveform 9A. As shown in waveform 9B, the PRI for the first beam is counted down between points A and B by increments of $\Delta t$. When point B is reached, the tracker begins counting down the PRI interval for the next pulse in the four beam threat signal which is a pulse of the second beam. At the same time that the count-down of the TOA for the pulse of the second beam is begun, the window signal, illustrated as the pulse waveform 9C, shows that a window is opened where the pulse predicted for the first beam of the threat signal is to be anticipated by the receiver 15. The deviation between the predicted TOA for the pulse of the first beam and the actual detection of the leading edge of the pulse of the first beam are used to determine the phase and PRI correction signals which are to be used in the prediction for the next pulse of the first beam. Waveform 9D shows that the PRI correction signal for the first beam (waveform 2D) is used to alter the PRI value for the first beam which is then stored in the PRI memory 110 and is not used again until the next predicted TOA for a pulse of the first beam is made at point K of waveform 9-B. The phase correction for the first beam, however, may be implemented during the decrementation of the PRI of the second beam because the four beams are phase coherent. This phase correction is shown to be implemented at point E of waveform 9B while the TOA of the pulse of the second beam (waveform 2E) is being decremented between points F and G. Therefore, the phase correction for the first beam is also useful to correct the phases of the second, third, and fourth beams. When point G is reached, the predetermined initial PRI value for the third beam (waveform 2F) is counted down from point H to point I. In the same manner as for the first beam, any correction in the PRI for the second beam is stored in the PRI memory 110 associated with the tracker tracking the threat signal of the waveform 9A during the decrementation of the TOA for the pulse of the third beam, while any correction for the phase of the second beam is implemented during the decrementation of the TOA for the pulse of the third beam. Similarly, when point I is reached, the TOA value for the pulse of the fourth beam (waveform 2C) of the threat signal of waveform 9A is counted down from point D to point J. In the same manner as for the second and third beams, any correction in the TOA for the fourth beam is stored in the address of the PRI memory 110 associated with the tracker tracking the threat signal of waveform 9A.

When point K is reached, the tracker calls the PRI value for the first beam from the address of the PRI memory 110 associated with the first beam of the threat signal of the waveform 9A which had been stored at point C in waveform 9D. This corrected PRI value is provided to the TOA memory 114 at the address which is associated with the tracker tracking the threat signal of waveform 9A and is decremented between points K and L. As was explained previously, any phase correction for the TOA of the first beam is implemented and a PRI correction for the first beam is stored in the appropriate memory location of the PRI memory 110. In an analogous manner, the tracker continues to track the four beams of the tracker signal of waveform 9A while constantly correcting errors in the PRI and phase predictions of the tracker.

From the foregoing explanation in relation to FIGS. 8 and 9, it will be appreciated that, even though all but one of the beams of a threat signal are absent, as, for example, where the second, third and fourth beams of waveform 9A were absent leaving only the first beam, the disclosed tracker will maintain phase coherence for all the beams of the threat signal which are phase coherent with respect to each other. Although the PRI prediction for a particular beam cannot be corrected if the pulse does not appear in the window which was provided for it, due to the phase coherence of all the beams, the phase correction of a single beam in the threat signal will provide for phase correction in all of the beams of the threat signal, thereby correcting for drift between the phase of the multiplexed tracker and the phase of the detected threat signal whenever a beam of the threat signal is detected by the receiver 15.

In accordance with the signal tracking system described in relation to FIGS. 1-9, it is shown that the beams of a threat signal will continue to be tracked once the RF and PRI parameters of the beams have been acquired by the multiplexed tracker. However, as was previously explained, the tracker depends upon the central processing unit 12 to detect threats that are to be tracked in accordance with the various signals detected by the receiver 15. More particularly, in response to the detected signals, if the central processing unit 12 makes an inaccurate determination of threats that are to be tracked, the tracker 10 will inaccurately track the threat and, consequently, indicate "ghost" threats, that is, threats which are not, in fact, present and/or fail to indicate a threat that is present. The preferred embodiment of the present invention meets the problem of the erroneous indication of a threat due to the detected beams which comprise the threat signals being staggered by some multiple of a fundamental pulse repetition interval by condensing threat signals from harmonically related beams.

Figure 10:
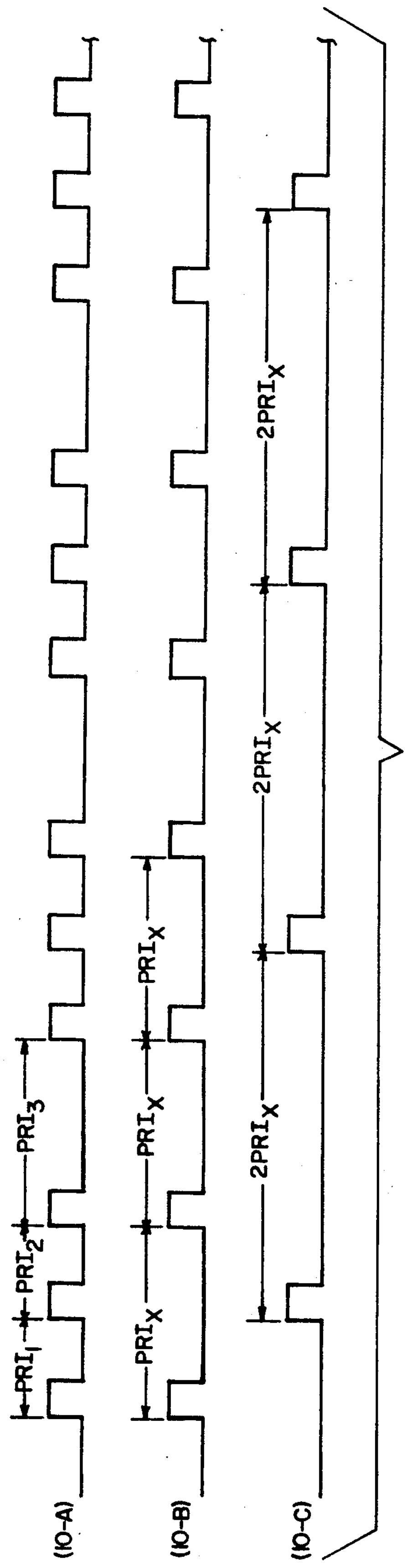
FIG. 10 represents typical waveforms which illustrate the operation of the disclosed radar system for condensing threat signals from harmonically related beams sorted from a pulse group.

A particular example of the operation of the preferred embodiment in accordance with the present invention for condensing threat signals from harmonically related beams is described in relation to the waveforms shown in FIG. 10. Waveform 10A of FIG. 10 illustrates a three stagger level threat signal wherein $PRI_1$ is equal to the value of $PRI_2$, but $PRI_3$ is twice the value of both $PRI_1$ and $PRI_2$. Waveform 10B illustrates a typical example of a beam which would be stored by the central processing unit from a group of pulses when the threat signal of waveform 10A was incident on the antenna 14. As shown in FIG. 10, waveform 10B is a single stagger level pulse train having a PRI value equal to $PRI_3$ of waveform 10A. The PRI value of waveform 10B is considered to be the basic, or fundamental, PRI value, and is represented on waveform 10B as $PRI_X$. Waveform 10C of FIG. 10 is a second single stagger level beam which, typically, would be sorted by the central processing unit from the pulse dwell which was taken during the incidence of the threat signal of waveform 10A on the antenna 14. The waveforms 10B and 10C have substantially identical RF values but, as shown in FIG. 10, the PRI of waveform 10C is 2 $PRI_X$, that is twice the fundamental PRI of waveform 10B.

Threat signal detectors of the prior art which operated on the premise that only beams having the same RF and PRI values can be staggered with respect to each other, would detect the presence of two threat signals, the first threat signal being waveform 10B and the second threat signal being waveform 10C. However, in accordance with the operation of the present invention as further described in FIGS. 13 through 18, the waveforms 10B and 10C, after being sorted from the group of pulses collected during the pulse dwell, are grouped together as having harmonically related PRI values and are condensed to form the three stagger level threat signal of waveform 10A which is the threat signal that is physically present.

Figure 11:
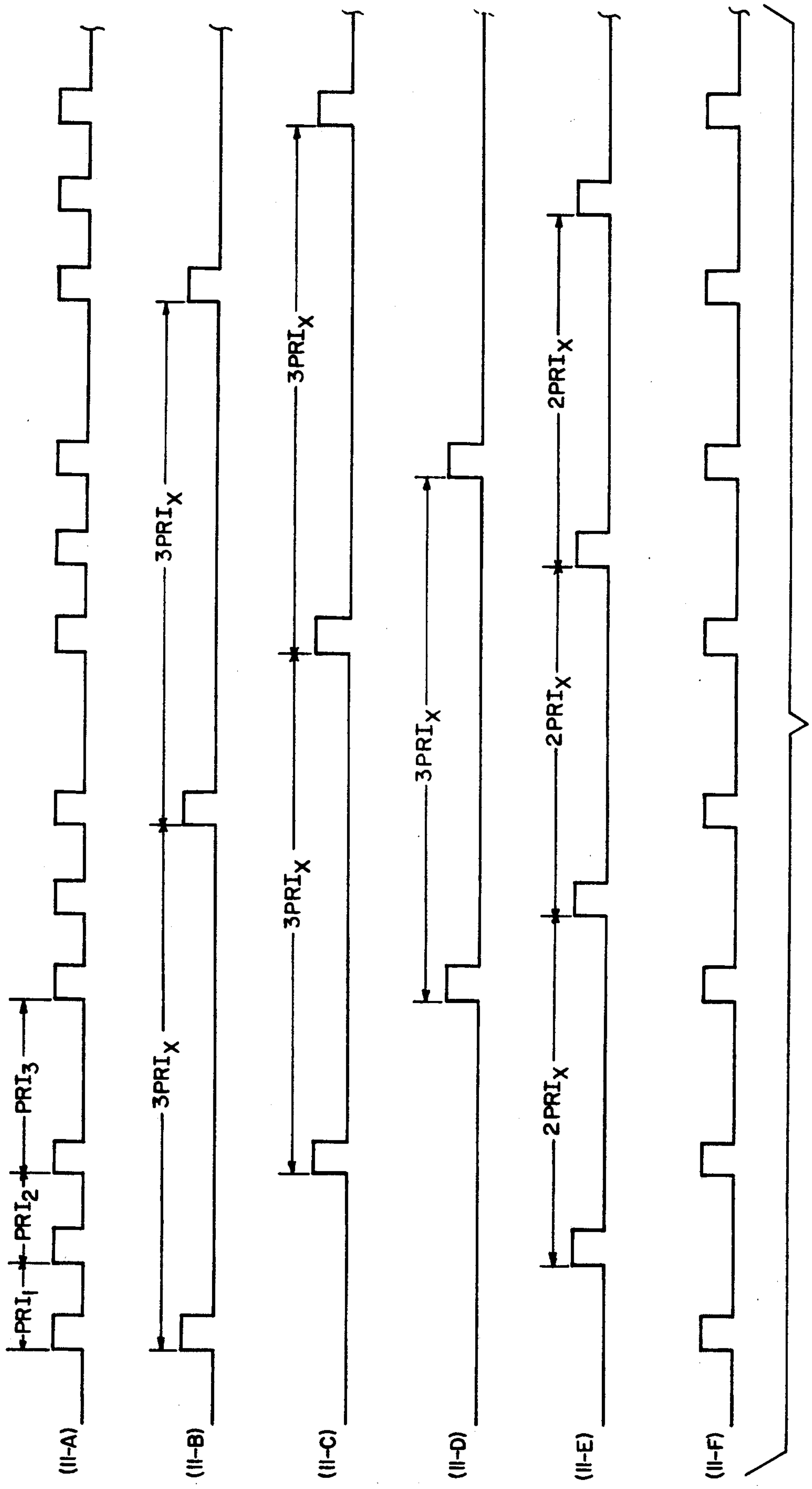
FIG. 11 shows a second example of typical waveforms which illustrate the operation of the disclosed radar system for condensing threat signals from harmonically related beams.

FIG. 11 illustrates a second example of the operation of the preferred embodiment in accordance with the present invention using the same threat signal illustrated as waveform 10A. In FIG. 11, the waveform 10A has been duplicated as the waveform 11A in which $PRI_1$ equals $PRI_2$ but $PRI_3$ is twice either of these PRI values. In the example of FIG. 11, the central processing unit 12 has sorted four beams from the pulse dwell containing the threat signal of waveform 11A. These four beams are illustrated as waveforms 11B, 11C, 11D, and 11E. Waveforms 11B, 11C, and 11D, as shown in FIG. 11, have PRI values which are three times the fundamental PRI value, $PRI_X$. Waveform 11E has a PRI value which is twice the fundamental PRI value, $PRI_X$. Prior art threat signal detectors capable of recognizing multiple stagger level threat signals in which the individual beams had substantially equivalent PRI values would collect the beams represented as waveforms 11B, 11C, and 11D into a single threat signal which is represented in FIG. 11 as waveform 11F. However, although the waveforms 11B through 11E had substantially similar RF values, the PRI value of waveform 11E is different from the PRI value that is common to the waveforms 11B through 11D. Therefore, these prior art threat signal detectors would detect two threat signals which are represented in FIG. 11 as waveforms 11E and 11F while failing to recognize the true threat signal of waveform 11A. Here again, in accordance with the present invention, after the central processing unit has sorted the waveforms 11B through 11E from the pulse dwell, these beams are grouped together as having harmonically related PRL values and the central processing unit 12, as further described in FIGS. 13 through 18, condenses these harmonically related beams to form the threat signal of waveform 11A which is the threat signal that, in fact, is physically present.

Figure 12:
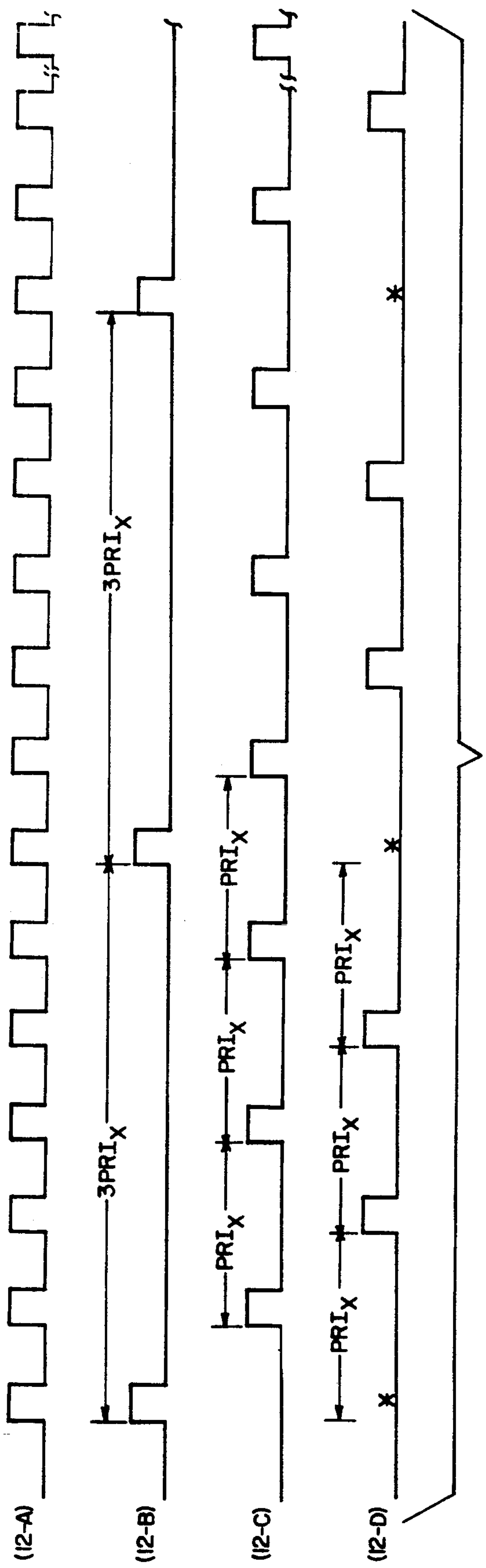
FIG. 12 shows a third example of typical waveforms which illustrate the operation of the disclosed radar system for condensing threat signals from harmonically related beams.

FIG. 12 illustrates an example of the operation of the preferred embodiment of the present invention in which the central processing unit 12 is provided with the capability to sort beams from a pulse dwell even though an occasional pulse that is necessary to a perfect reconstruction of the beam is occassionally omitted. The threat signal of interest in FIG. 12 is illustrated as the waveform 12A; this threat signal is present during the pulse dwell of the receiver 15 when the receiver accumulates the group of pulses incident on the antenna 14. In this example, waveform 12C represents a beam that is sorted from the pulse group where this beam is considered to have the fundamental PRI value $PRI_X$. The beam represented an waveform 12B has substantially the same RF value as the waveform 12C but, in this case, the PRI value is three $PRI_X$. From a comparison of the waveform 12B and waveform 12C with the waveform 12A, it will be seen that a number of pulses in the waveform 12A have remained unaccounted for by the beams of waveforms 12B and 12C. In fact, if certain omitted pulses of the waveform can be tolerated, a beam of the fundamental PRI value can be sorted from the remaining pulses of the pulse group as illustrated in waveform 12D. Specifically, these omissions in the waveform 12D are the pulses that comprise the beam of waveform 12B as indicated by asterisks at the corresponding points in the waveform 12D. Where the central processing unit 12 has the capability of sorting a beam when four out of a possible five pulses of the beam are present, the central processing unit 12 would, in fact, sort out and recognize as a beam the waveform 12D in which the points indicated by asterisks would be assumed to have pulses. In a manner similar to that discussed for FIG. 11, a prior art threat signal detector would combine the waveforms 12C and 12d to recognize the true threat signal illustrated as waveform 12A. However, since the PRI values of waveform 12B are three times the PRI values of waveforms 12C and 12D, the prior art threat signal detector would also recognize the beam of waveform 12B as a threat signal thereby indicating a phantom, or ghost threat which was not physically present. In accordance with the present invention, however, the central processing unit 12 combines the waveforms 12B, 12C and 12D to form the threat signal of waveform 12A which is physically present and, at the same time, eliminates any extraneous beams. In the example of FIG. 12, the central processing unit 12 eliminates the extraneous beam of waveform 12B.

The operation of the central processing unit to condense threat signals from harmonically related beams of a pulse group to eliminate the detection of phantom threat signals and the failure to recognize threat signals which are physically present in cooperation with the apparatus described in relation to FIGS. 1 through 9 can be accomplished by the appropriate programming of the central processing unit 12. In the example of the preferred embodiment, a detailed description of a suitable program is given in relation to FIG. 13.

In accordance with operations well known and understood in the art, the central processing unit 12 sorts pulse trains which represent beams from the pulse group detected by the receiver 15 and stored in the buffer memory 52. These beams are stored in the memory of the central processing unit 12 where beams having substantially equivalent RF values are circularly linked together. That is, beams having substantially equivalent RF values are referenced to at least one other beam having a substantially equivalent RF value. After the beams have been sorted from the pulse group and link listed according to their RF values, the beams are ordered in accordance with their increasing PRI values. Thus, the beams are sorted from the pulse group and beams having substantially equivalent RF values are arranged in order of their increasing PRI values to form PRI ordered, RF beam groups.

After forming PRI ordered, RF beam groups from the pulse group stored in the buffer memory 52, the central processing unit 12 analyzes each PRI ordered RF beam group for harmonic subgroups which it may contain. As used herein, harmonic subgroups are defined to be groups of beams which have substantially equivalent RF values and which also have a fundamental PRI value or some multiple of the fundamental PRI value. Therefore, each beam of the harmonic subgroup will have a common RF value and will have a fundamental PRI value or some multiple of the fundamental PRI value.

The analysis of the PRI ordered RF groups as performed by the central processing unit 12 is accomplished by any suitable method known in the art. For the particular example of the preferred embodiment, the central processing unit 12 selects the PRI of the first beam in the link listed RF beam group as being the fundamental PRI and successively compares all subsequent PRI values of beams in the RF beam group with the fundamental PRI value thus established to determine whether these subsequent PRI values are harmonics of the fundamental PRI value. As used herein, a PRI value is considered a harmonic of the fundamental PRI value only if two conditions are satisfied. The conditions for establishing a harmonic relationship between PRI values are that the product $$\frac{1}{n} * \text{Fundamental } PRI \qquad (1)$$

is integrally divisible into the PRI value being compared against the fundamental PRI and; that n is the smallest positive integer for which this integral division may be performed. The criterion for integral divisibility is that the quotient of the remainder of the division of equation (1) divided by the difference of the divisor (n) and the remainder is less than or equal to a constant representing some minimum permissible remainder. This is expressed in mathematical form as follows:

$$\text{MIN(residue, divisor-residue)} \leqq \text{constant} \qquad (2)$$

The quotient of a division which satisfies these two conditions is thus established as the harmonic number for the beam. The product described in Equation (1) above is then substituted as the fundamental PRI value and the product $$n * \text{Harmonic Number} \qquad (3)$$

is then substituted as the harmonic number for other beams previously included in the harmonic subgroup.

After all the beams in the RF group have been analyzed for PRI values which are harmonically related to the PRI value of the first beam in the RF group, the central processing 12 determines whether any beams are left in the RF group which were not harmonically related to the PRI value of the first beam. If beams that are harmonically unrelated to the first beam of the RF group are found, a second harmonic subgroup is initiated by taking the beam having the lowest PRI value among the remaining beams as having the fundamental PRI value for this second harmonic subgroup. The second harmonic subgroup is then formed by comparing the remaining beams in a process substantially similar to that previously described for forming the first harmonic subgroup from all of the beams of the RF group. Similarly, if harmonically unrelated beams of the RF group still reamin after the second harmonic subgroup is formed, a third harmonic subgroup is formed from the remaining beams in accordance with the above-described method until all of the beams of the RF group are collected in subgroups of beams having harmonically related PRI values.

In accordance with the present invention, the central processing unit 12 condenses threat signals from harmonically related beams of a pulse group detected by the receiver 15 as is described with respect to FIGS. 13 through 18. As described above, every beam in the harmonic subgroup has a harmonic number associated with it. The central processing unit 12 also associates with each beam a TOA value which is the TOA of the first pulse in the beam. As more particularly described in the flow charts of FIG. 14, the central processing unit 12 determines the lowest common multiple, or lowest common denominator, of the harmonic number associated with the beams of a harmonic subgroup. The cycle time for the harmonic subgroup is then established by multiplying the fundamental PRI value for the harmonic subgroup by the lowest common multiple value. The central processing 12 then establishes a cycle time array which is a listing of all the pulses from every beam in the harmonic subgroup which, according to the TOA value of each pulse, arrive during a single cycle time of the harmonic subgroup as is further described in relation to FIGS. 15 and 16. Briefly, this is accomplished by standardizing the TOA of every beam in the harmonic subgroup with respect to the TOA of the first beam in the subgroup. The cycle time array is then established by taking the standardized TOA of each beam and adding to the array successive pulses of that beam until the cycle time established for the harmonic subgroup is exceeded. Then, as further described in relation to FIG. 17, the beams of the cycle time array are arranged in order of increasing TOA values, duplicate beams are deleted from the array and the maximum time between successive pulses in the array is determined. As further described in relation to FIG. 18, the smallest repeating pulse pattern in the cycle time array is determined in accordance with the following criteria:

1. Each pulse of the smallest repeating pulse pattern repeats throughout the cycle time array at some predictable interval the magnitude of which is strictly dependent upon the pulse pattern
2. If the pulse pattern is repeated throughout the cycle time array, no pulses will remain in the cycle time array; and
3. There is a pulse contaned in the cycle time array for each pulse called for by the repitition of the repeating pulse pattern throughout the cycle time array.

When no repeating pattern which satisfies these three conditions is found within the cycle time array, the stagger level of the threat signal is equal to the total number of pulses in the cycle time array, and the cycle time of the threat signal is equal to the period of the cycle time array. If, however, a smaller repeating pulse pattern is established within the cycle time array, the stagger level of the threat signal equals the number of pulses in the repeating pulse group and the cycle time of the threat signal equals the period of the pulse group.

After the cycle time and stagger level of the threat signal have been determined in accordance with the above description, the stagger range of the threat signal is determined by subtracting the average PRI value of the threat signal from the maximum difference between successive pulses of the cycle time array. The cycle time for the threat signal is then determined from the PRI of the beam having the first TOA value among beams remaining in the harmonic subgroup and other beams from the harmonic group are then deleted from the memory of the central processing unit 12.

Figure 13:
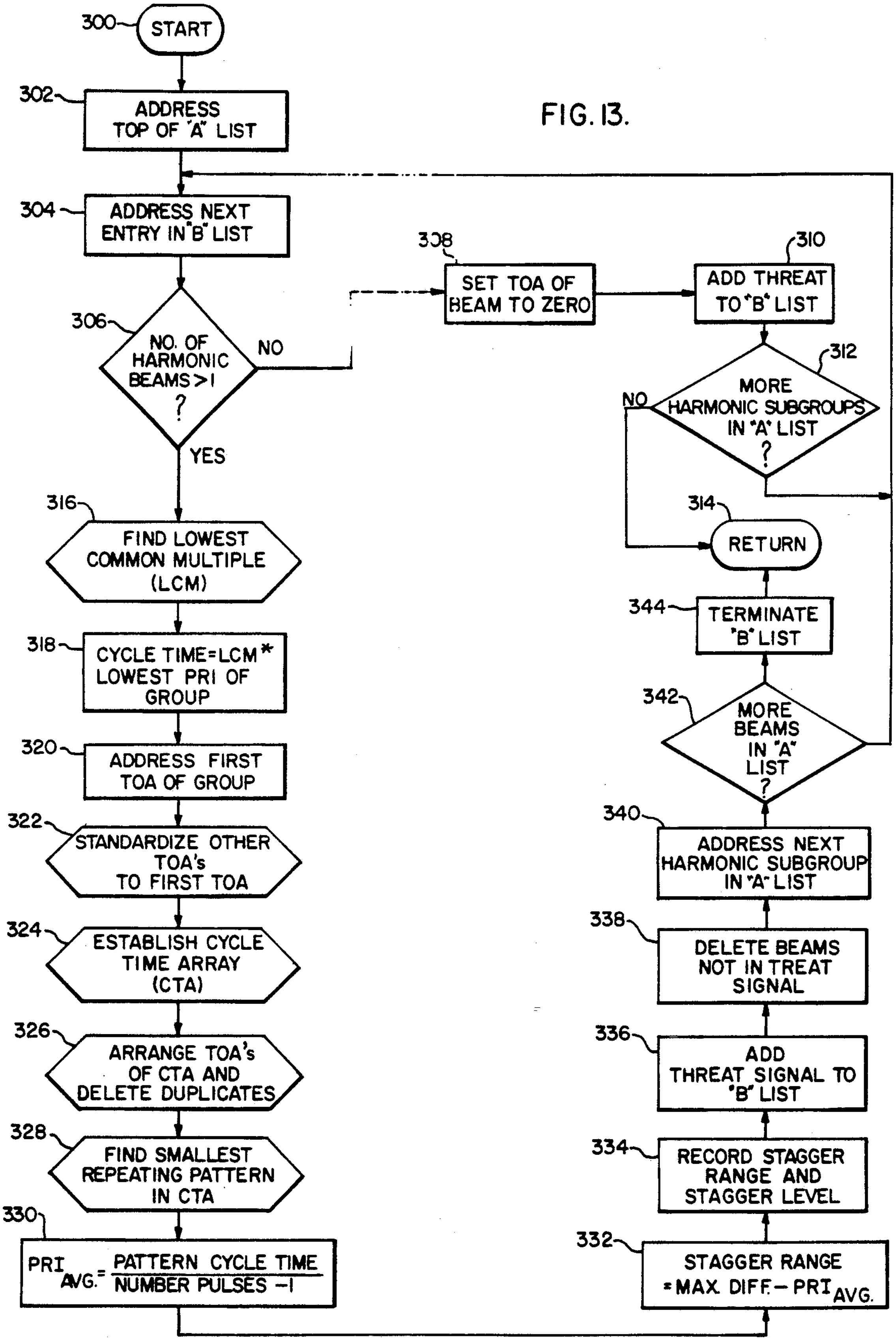
FIG. 13 is a flow chart describing the operation of the central processing unit in condensing threat signals from harmonically related beams of a pulse group detected by the receiver.

The operation of the central processing unit 12 in condensing harmonically related beams to form a threat signal is more particularly described in relation to the flow chart of FIG. 13. In FIG. 13, the central processing unit 12 initiates the operation of condensing harmonically related beams to form a threat signal at step 300 and, at step 302 addresses the first member of "A" list which is a group of link listed addresses in which the harmonically related subgroup of beams that are being condensed to form a threat signal are stored. Next, at step 304, the central processing unit 12 addresses an entry in "B" list, which is a group of link listed addresses in which the threat signals that will be condensed from the beams of the harmonically related subgroup will be stored. At step 306, the central processing unit 12 determines whether the number of harmonically related beams in the harmonic subgroup is greater than one. If the number of harmonically related beams is not greater than one, it is evident that the single beam represents a threat signal and the central processing unit proceeds to step 308 at which the TOA of this beam is set at zero. At step 310, this threat signal is added to the address of "B" list which was previously addressed at step 304, and, at step 312, the central processing unit determines whether additional harmonic subgroups remain in "A" list. If additional harmonic subgroups remain, the central processing unit returns to step 304 and proceeds as previously described, but if no more harmonic groups remain on "A" list, the central processing unit has condensed all of the harmonically related beams into threat signals and, therefore, returns to the executive program at step 314.

Figure 14:
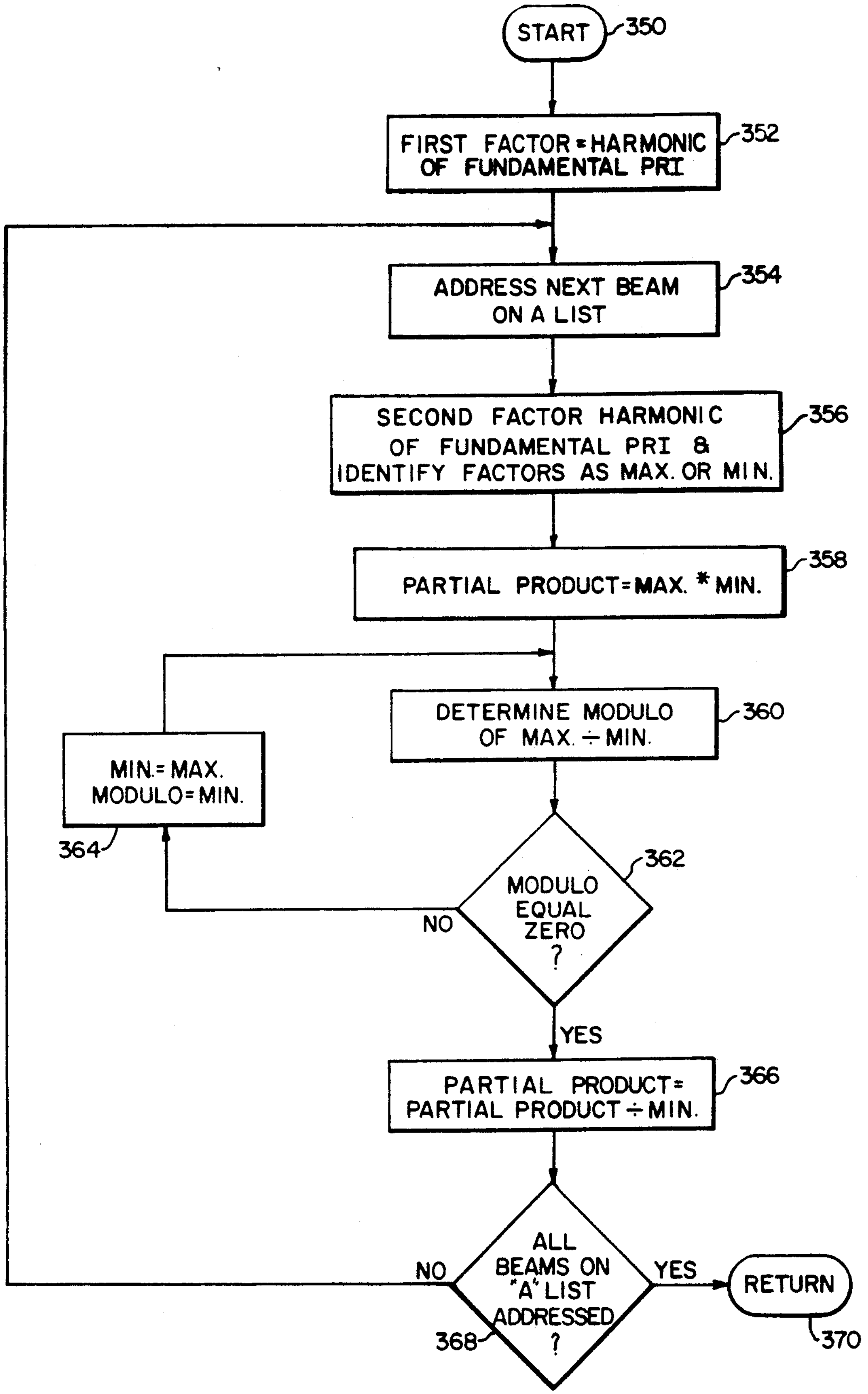
FIG. 14 is a flow chart which further describes the step of finding the lowest common multiple for a group of harmonically related beams as described in FIG. 13.

If at step 306, it is determined that more than one beam is contained in the harmonically related subgroup, the lowest common multiple for the beams of the harmonically related subgroup is determined at step 316 in accordance with the operation as further described in relation to FIG. 14. At step 318, the central processing unit determines the cycle time for the cycle time array from the product of the lowest common multiple determined at step 316 and the lowest PRI value of beams in the harmonic subgroup. At step 320, the beam having the first TOA is addressed and, at step 322 the TOA's of other beams of the subgroup are standardized with respect to the TOA addressed at step 320. This standardization process is further described in relation to FIG. 15. At step 324, the cycle time array (CTA) is established and, at step 326, the beams of the CTA are arranged in order of their increasing TOA values and duplicative beams are deleted from the CTA as further described in relation to FIGS. 16 and 17, respectively. As further discussed with respect to FIG. 18, the central processing unit, at step 328 finds the smallest repeating pattern in the CTA. At step 330, the average PRI ($PRI_{AVG}$) for the smallest repeating pattern found at step 328 is established in relation to the quotient of the cycle time of the smallest repeating pattern and the number of pulses in the smallest repeating pattern. At step 332, the stagger range is determined from the difference of the maximum time interval between successive pulses in the CTA and the $PRI_{AVG}$ established at step 330. At step 334, the stagger range and stagger level of the threat signal are recorded and, at step 336 the threat signal is added to "B" list at the address which was previously accessed at step 304. At step 338, the beams of the harmonic subgroup which were found not to be contained in the threat signal that was stored at step 336 are deleted from the memory of the central processing unit 12, and at step 340 the next harmonic subgroup in "A" list is addressed. At step 342, the central processing unit determines whether any more beams remain in "A" list and, if no more beams remain in "A" list, "B" list, which contains the threat signals, is terminated at step 344 and the central processing unit returns to the executive program at 314. If, however, at step 342 it is determined that more beams remain in "A" list, the central processing unit returns to step 304 and proceeds as described above until all the beams in "A" list have been condensed into threat signals.

The flow chart of FIG. 14 further illustrates the operation of the central processing unit 12 at step 316 of the flow chart of FIG. 13 in which the lowest common multiple (LCM) of harmonically related beams is determined. The operation of the central processing unit 12 begins at step 350, and at step 352 establishes a first factor which is equal to the harmonic value of the fundamental PRI for the first beam of the harmonic subgroup. At step 354, the next beam of the harmonic subgroup is addressed, and at step 356 a second factor is established which is equal to the harmonic value of the fundamental PRI for this next address beam. Also at step 356, this second factor is identified as either maximum or minimum in comparison to the first factor established at step 352, and the first factor is then assigned the complementary identification. A partial product value is established at step 358 from the product of the first and second factors. At step 360, the central processing unit determines the remainder or "modulo" of the maximum factor divided by the minimum factor. At step 362, the central processing unit decides whether the modulo value determined at step 360 is substantially equal to zero. If the modulo value determined at step 360 is not substantially equal to zero, the value of the minimum factor is substitute for the value of the previous maximum factor and the modulo value is substituted for the value of the previous minimum factor. The central processing unit then returns to step 360 to divide the new maximum factor by the new minimum factor to determine a new modulo value. This division and substitution process continues until it is determined at step 362 that the modulo value is substantially equal to zero. When it is determined at step 362 that the modulo value is substantially equal to zero, the central processing unit determines, at step 366, a new partial product from the quotient of the partial product determined at step 358 and the minimum factor. The minimum factor was determined at step 356 if the modulo value was substantially equal to zero after the first division of the maximum factor by the minimum factor at step 360, otherwise the minimum factor was determined at step 364. The central processing unit 12 then determines, at step 368, whether all the beams in "A" list have been addressed. If all the beams in "A" list have not been addressed, the operation returns to step 354 and proceeds through steps 356 through 366 as previously described. If all the beams in "A" list have been addressed, the central processing unit 12, at step 370, returns to the flow chart of FIG. 13. Therefore, the flow chart of FIG. 14 determines the lowest common multiple (LCM) of the harmonic numbers of all the beams in a harmonic subgroup. As a new beam on the harmonic list is addressed, a partial product is formed from the harmonic number of the new beam and either the harmonic number of the first beam in the harmonic subgroup or a previously determined greatest common divisor of the harmonic subgroup. The greatest common divisor between the harmonic number of the new beam and either the harmonic number of the first beam or the previously determined greatest common divisor is then determined and a new partial product is established by dividing the greatest common divisor (GCD) into the previously established partial product to provide the lowest common multiple of the harmonic subgroup.

Figure 15:
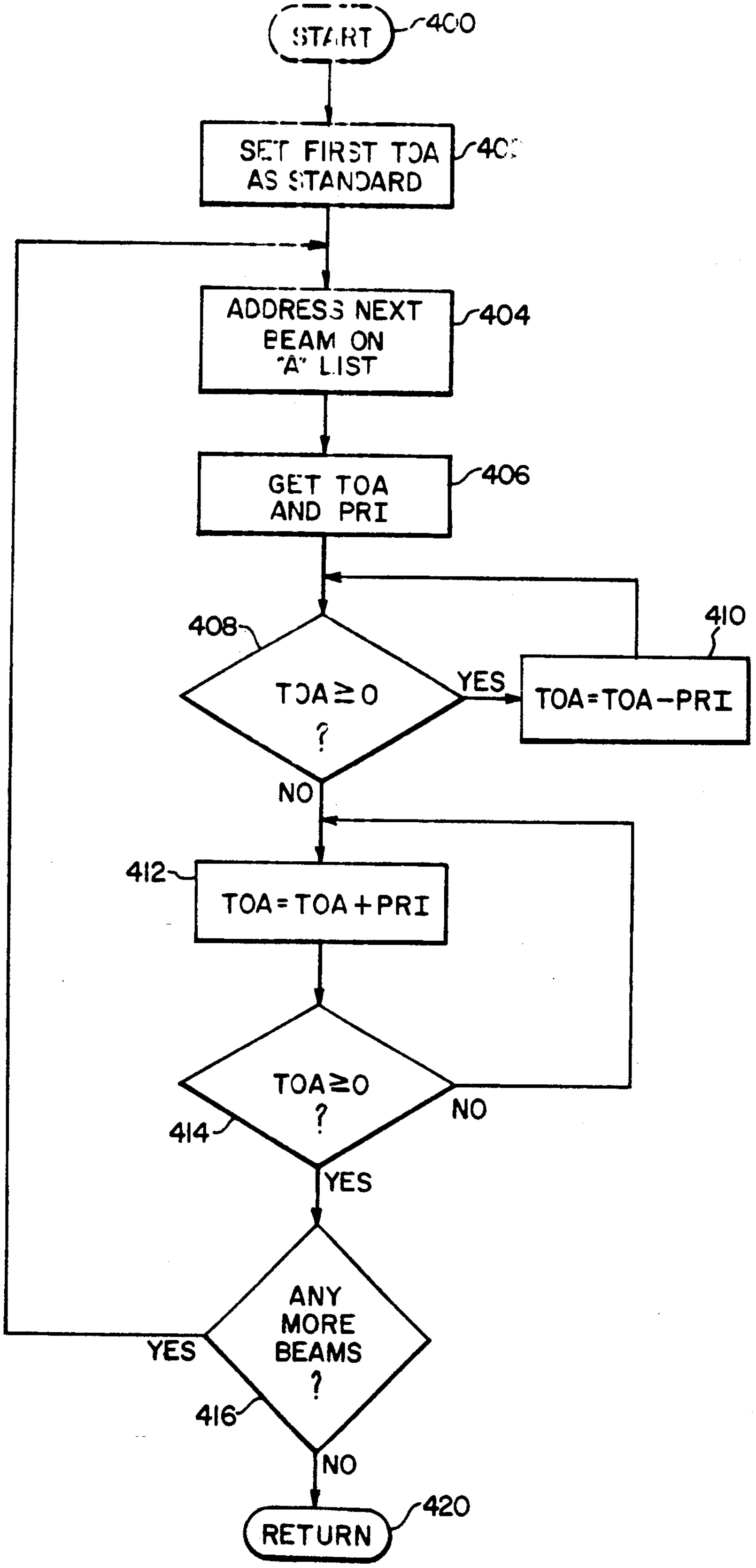
FIG. 15 further describes the step of standardizing the pulses of a group of harmonically related beams as used in the flow chart of FIG. 13.

FIG. 15 is a flow chart further describing the operation of the central processing unit 12 in standardizing the beams of a harmonic group with respect to the beam having the first occurring TOA in step 322 of FIG. 13. The central processing unit initiates this standardization procedure at step 400 of FIG. 15 and, at step 402 sets the TOA of the first pulse of the first beam as the standard TOA. At step 404 the central processing unit addresses the next beam on "A" list, and at step 406 obtains the TOA value of the first pulse of this beam and the PRI value of this beam. At step 408, the TOA of this next beam is compared with the TOA which was set as a standard at step 402. If the TOA of the next beam is greater than or equal to the standard TOA established at step 402, the TOA value is replaced by the difference of the PRI value from the TOA value at step 410 and then is again compared to the TOA value which was established as a standard. The TOA value of this second beam is repeatedly compared to the TOA value of the first beam until the TOA value of the second beam has been decremented to a value less than the standard TOA as determined by the comparison as step 408. When the TOA of the next beam is less than zero, the central processing unit increments the TOA value by incremental units of the PRI for the second beam at step 412 and compares this new TOA value with the standard TOA at step 414. If the TOA value of the next beam is less than the standard TOA as determined by the comparison at step 414, the TOA value is again incremented at step 412 and is repeatedly incremented thereafter until the TOA of the second beam exceeds the TOA which was established as a standard at step 402. When the TOA of this next beam exceeds the standard TOA, the central processing unit determines whether any more beams remain in the harmonic subgroup at step 416. If more beams remain in the harmonic subgroup, the operation returns to step 402 and proceeds as previously described in relation to steps 404 through 414. When no more beams remain in the harmonic subgroup, the central processing unit 12 returns at step 420 of FIG. 15 to step 322 of FIG. 13. Accordingly, standardization of the TOA's of the first pulse for each beam in the harmonic subgroup is accomplished by adding PRI values to the TOA of beams whose TOA value is less than the value of the TOA for the first beam, and by subtracting PRI values from the TOA value of beams whose TOA exceeds the TOA of the first beam until the TOA's of the beams in the harmonic subgroup are equal to or less than one PRI greater than the TOA of the first beam.

Figure 16:
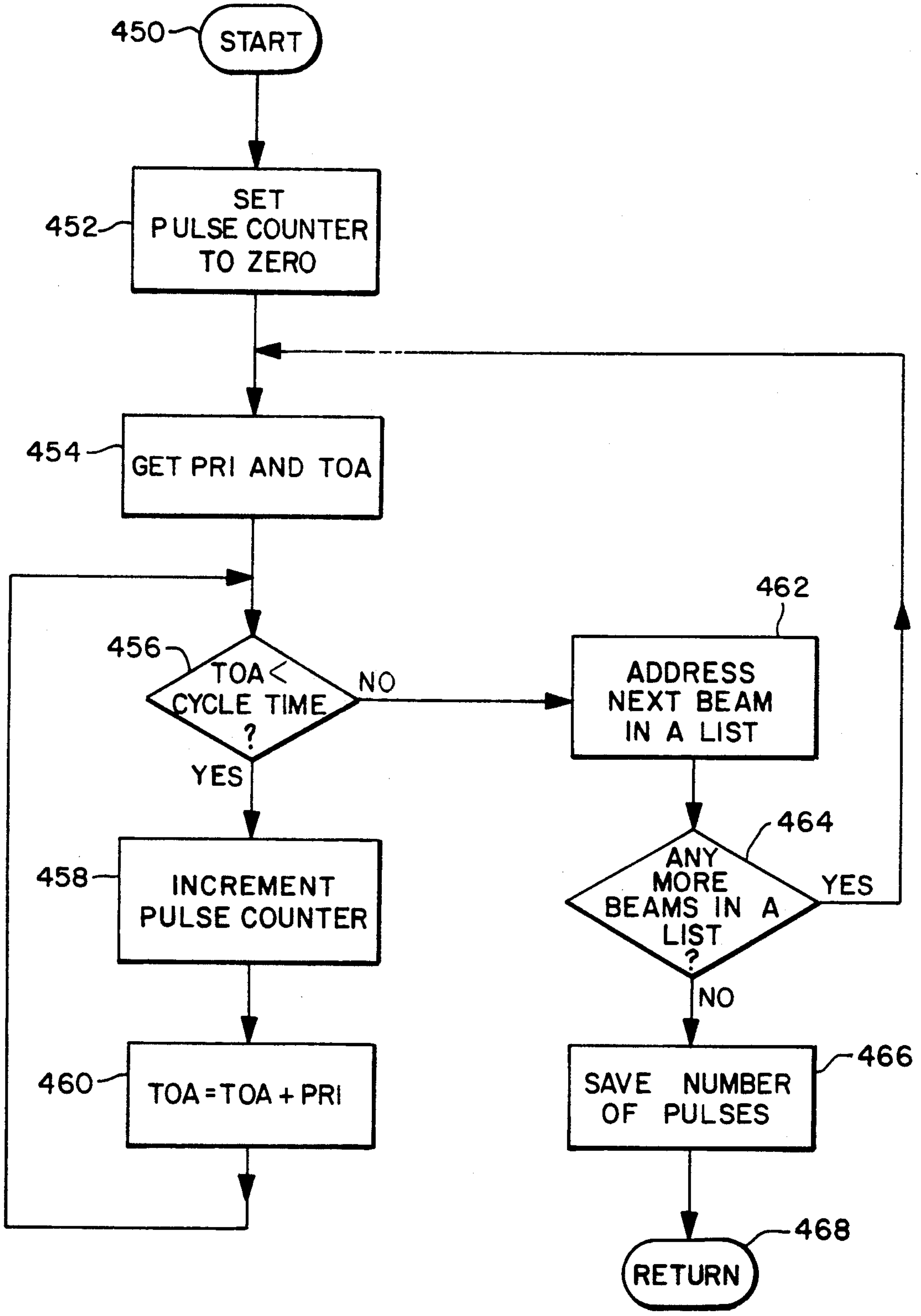
FIG. 16 is a flow chart further describing the step of establishing a cycle time array as used in FIG. 13.

The flow chart of FIG. 16 illustrates the operation of the central processing unit at step 324 of FIG. 13 in which the cycle time array (CTA) is established. The central processing unit initiates this process at step 450 and, at step 452 sets a pulse counter to zero. At step 454 the PRI and TOA values corresponding to the first harmonic beam are obtained and, at step 456 the TOA value of the first beam is compared to the cycle time established at step 318 in FIG. 13. If, at step 456, it is determined that the TOA is less than the cycle time, the pulse counter which was set to zero at step 452 is incremented at step 458 and the TOA value which was obtained at step 454 is incremented by the PRI value for the beam at step 460. The central processing unit then returns to step 456 and again compares this new TOA value with the cycle time value. This comparison is repeated and the TOA value of the beam is incremented by values of the beam PRI until the TOA value is equal to or greater than the cycle time. When the TOA value is equal to or greater than the cycle time, the central processing unit addresses the next beam in "A" list at step 462 and, at step 464 determines whether any more beams remain in "A" list. If more beams remain in "A" list, the central processing unit returns to step 454 and proceeds as previously described in relation to steps 454 through 462 until all the beams in the harmonic subgroup have been similarly processed. When it is determined at step 464 that all of the beams in the harmonic subgroup have been processed, the number of pulses is stored at step 466 and the operation of the central processing unit returns to step 324 of FIG. 13 at step 468. Therefore, the central processing unit establishes the CTA which contains all the pulses detected by the receiver 15 during the cycle time established at step 318 of the flow chart of FIG. 13 and which also were included in beams of a harmonically related subgroup, by adding all the pulses which occur within the cycle time of the standardized TOA of the first beam in the harmonic subgroup.

Figure 17:
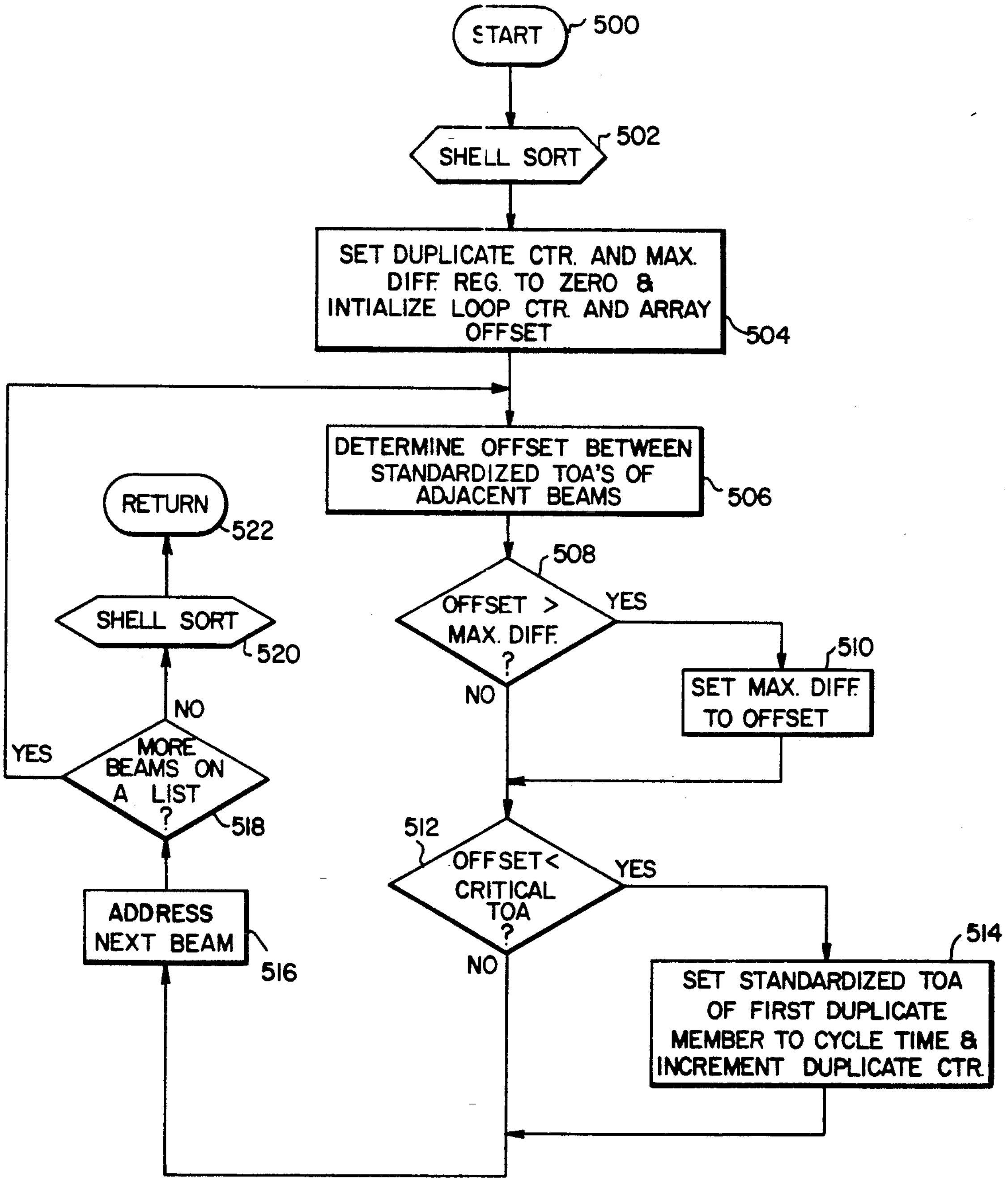
FIG. 17 is a flow chart which further describes the arrangement of TOA's of a group of harmonically related beams as used in the flow chart of FIG. 13.

The flow chart of FIG. 17 further describes the operation of the central processing unit 12 in arranging the beams of the cycle time array, deleting duplication beams from the CTA, and determining the maximum time between successive pulses in the array as was previously described at step 326 of FIG. 13. The central processing unit 12 initiates its operation at step 500 and, at step 502 performs a SHELL sort routine. This routine is well known and understood by those skilled in the radar art and is described in detail in *Sorting And Searching* by Donald E. Knuth, Addison-Westley Publishing Company, Copyright 1973, pages 84–99. This routine operates to arrange the beams of the harmonic subgroup in the order of increasing value of the TOA's corresponding to each beam. Therefore, after the SHELL sort routine is performed, potential duplicate beams in the cycle time array will be arranged adjacent to each other. At step 504, a duplicate counter and maximum difference register are set at zero and a loop counter and array offset register are initialized. At step 506, the central processing unit determines the offset between the TOA's of the first two beams of the harmonic subgroup and, at step 508 determines whether this offset value between the TOA's of the adjacent beams is greater than the maximum difference between successive pulses of adjacent beams which had been previously established. Where this offset value is greater than any previously established maximum difference, the offset value is substituted for the maximum difference at step 510. If the offset value is less than or equal to a previously established maximum difference, or after it has been substituted for a smaller maximum difference at step 510, the central processing unit determines whether the offset is less than a critical TOA difference at step 512. This critical difference is established as a value which is essentially zero so that step 512 will detect conditions at which there is substantially no offset between the TOA's of adjacent beams in the harmonic subgroup. That is, with the critical TOA value set at zero, step 512 detects conditions where adjacent beams in the harmonic subgroup have substantially the same TOA. Where the offset is less than the critical value as determined at step 512, the central processing unit substitutes the cycle time of the cycle time array for the TOA value of the first beam and increments the duplicate counter. When the offset value of the adjacent beams is equal to or greater than the critical TOA value as determined at step 512 or the cycle time of the cycle time array is substituted for the TOA of the first of the adjacent beams at step 514, the central processing unit addresses the next beam in "A" list at step 516 and determines at step 518 whether any beams remain on "A" list. If more beams remain on "A" list, the process returns to step 506 and proceeds through steps 506 through 516 as previously described. Where it is determined at step 518 that no more beams remain on "A" list, a second SHELL sort routine is performed at step 520 to again arrange the beams of the harmonic subgroup in order of their increasing TOA values. Since the cycle time was substituted for the TOA value of duplicate beams in the harmonic subgroup at step 514, these duplicate beams will be ordered last in the harmonic subgroup by the SHELL sort routine performed at step 520. The central processing unit 12 then returns at step 522 of FIG. 17 to step 326 of FIG. 13 in which the number of beams in the cycle time array is decremented by the number of duplicates as determined by the duplicate counter in step 514 of FIG. 17.

Figure 18:
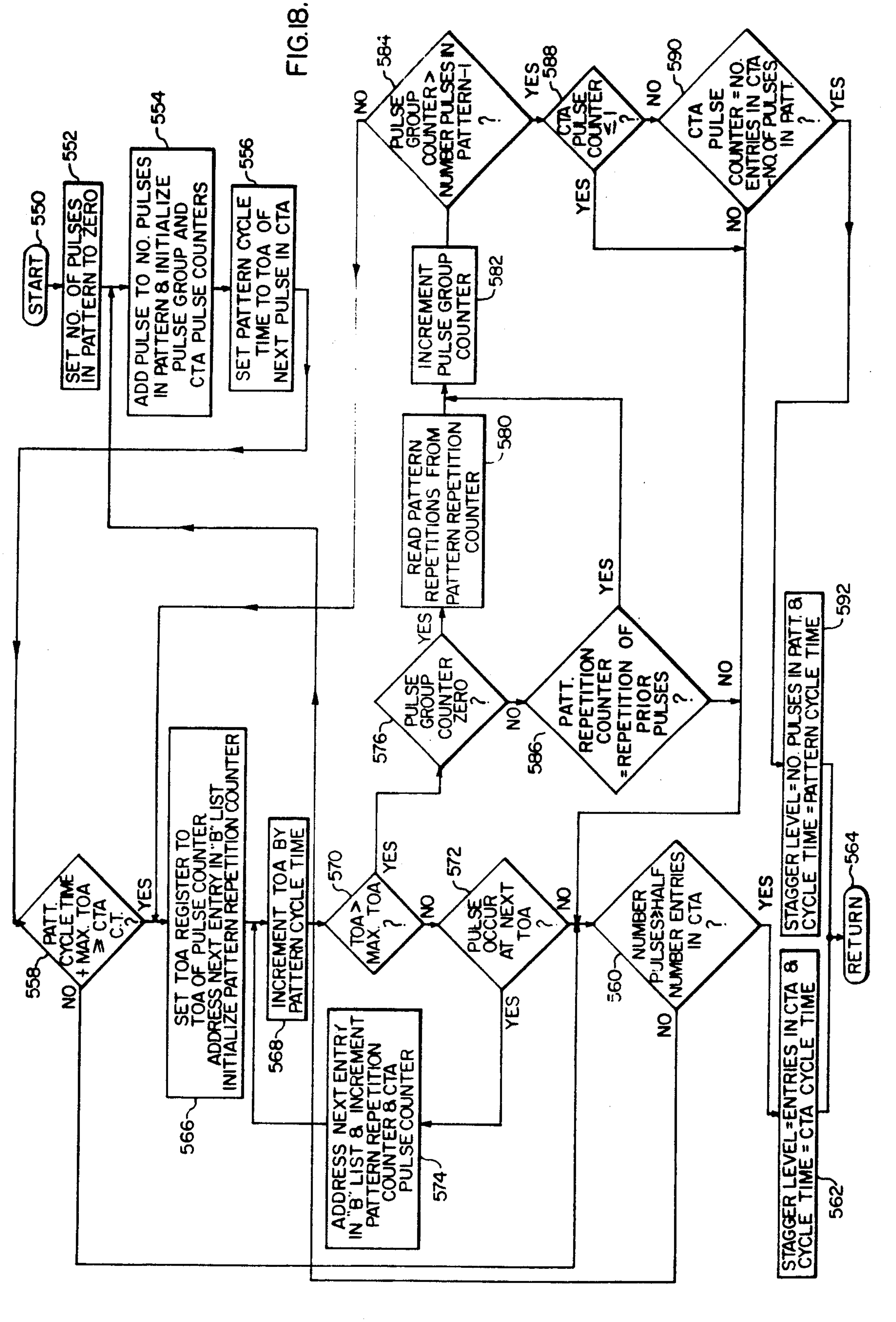
FIG. 18 is a flow chart which further describes the step of finding the smallest repeating pattern in the cycle time array as used in the flow chart of FIG. 13.

FIG. 18 illustrates the operation of the central processing unit 12 as described in step 328 of FIG. 13 in finding the smallest repeating pattern in the CTA. This operation of the central processing unit 12 is initiated at step 550 and, at step 552 the number of pulses in the smallest repeating pattern is set equal to zero. At step 554, a pulse is added to the number of pulses in the pulse repetition pattern. Also at step 554, a pulse group counter and a CTA pulse counter are initialized. At step 556, the cycle time for the smallest repeating pattern is set equal to the TOA of the next pulse, following the last pulse of the current pulse repetition pattern in the CTA. Step 558 determines whether there are any missing pulses to complete the smallest repeating pattern throughout the CTA by comparing the sum of the pattern cycle time and the TOA of the last pulse in the CTA with the CTA cycle time. If the sum of the pattern cycle time and the last TOA in the CTA (hereafter referred as the MAX TOA) is less than the CTA cycle time, at least one complete pattern would still be possible after the last pulse observed and, therefore, there must be pulses missing in the CTA if this pattern is to be repeated throughout the CTA. Therefore, the central processing unit proceeds to step 560 to determine whether the number of pulses currently in the pulse repetition pattern is less than one-half the total number of entries in the CTA. If the number of pulses in the pulse pattern is greater than or equal to one-half the total number of entries in the CTA, it is no longer possible that there be more than one repeating pattern which could be fully completed within the CTA so that the central processing unit determines, at step 562, that the stagger level of the threat signal is equal to the number of entries in the CTA and that the cycle time of the threat signal is equal to the cycle time of the CTA and, at step 564 returns to step 328 of FIG. 13. However, if it is determined at step 560 that the number of pulses in the proposed repeating pattern is less than one-half the total number of entries in the CTA, it is still possible that another repeating pattern having a larger number of pulses may be found and, accordingly, the central processing unit returns to step 554 to add the next pulse to the proposed repetition pulse pattern.

If it is determined at step 558 that the sum of the pattern cycle and the MAX TOA is greater than or equal to the cycle time of the CTA, there are, at this point, no prior reasons to believe that there are missing pulses in the proposed pulse repetition pattern and the central processing unit proceeds to step 566 of the flow chart. At step 566, a TOA register is set to the TOA corresponding to the pulse in the CTA indicated by the pulse counter, the next entry in "B" list is addressed, and a pattern repetition counter is initialized. At step 568 the TOA value which was set in step 566 is incremented by the pattern cycle time which was set at step 556. At step 570, this TOA value is compared with the MAX TOA value to determine whether the TOA of the pulse can be expected to occur within the CTA. If, at step 570, it is found that the TOA value is less than or equal to the MAX TOA value, the central processing unit determines, at step 572, whether a pulse having a TOA corresponding to the TOA established at step 568 in fact occurred within the CTA. Therefore, in accordance with the criteria which were previously set forth as determinant of whether a smaller repeating pattern of pulses exists within the CTA, step 572 determines whether the pulse of the proposed repeating pattern repeats throughout the CTA. If there are missing pulses, the central processing unit proceeds to step 560 to determine whether the number of pulses in the proposed repeating pattern is small enough to permit the repetition of the pattern throughout the CTA as described previously. If, at step 572, a pulse corresponding to the TOA established at step 568 is found in the CTA, the process proceeds to step 574 to address the next entry in "B" list which is the listing of the CTA pulses and also to increment the pattern repetition and CTA pulse counters. Afterwards, the central processing unit returns to step 568 to again increment the TOA by the cycle time of the proposed pattern. The central processing unit 12 continues to cycle through steps 568 through 574 as long as a pulse corresponding to each TOA can be found in the CTA until the TOA value exceeds the maximum TOA at step 570. When this occurs, the central processing unit proceeds to step 576 to determine whether steps 568 through 574 have been tracking the first pulse in the proposed pattern through the CTA by determining whether the pulse group counter is equal to zero. If the pulse group counter is equal to zero, the central processing unit has been tracking the first pulse in the proposed pulse pattern through steps 568-574 and therefore proceeds to step 580 at which the number of pattern repetitions within the CTA are obtained from the pattern repetition counter. At step 582, the pulse group counter is incremented to advance the operation of the central processing unit to the next pulse in the proposed repeating pattern. Step 584 determines whether all the pulses in the proposed repeating pulse pattern have been considered in the previous steps by comparing the pulse group counter with the difference of the number of pulses in the proposed repeating pattern minus one. If the number indicated by the pulse group counter is greater than this difference, the central processing unit returns to step 566 to consider the next pulse of the pulse repeating pattern in steps 566 through 576 as previously described. When, at step 576, the pulse which is tracked through steps 568 through 574 has not been the first pulse in the proposed repeating pattern, the pulse group counter will not be equal to zero and the central processing unit operation proceeds to step 586 to determine whether pattern repetition counter now equals the repetitions of prior pulses as was previously determined at step 580. By making this comparison, the central processing unit determines whether this pulse is repeated the same number of times as previous pulses of the proposed repeating pattern. That is, step 586 determines whether the proposed repeating pattern, as thus far established, has been repeated an equal number of times throughout the CTA so that each repetition of the pattern contains the same number of pulses. If this pulse in the pattern has not been repeated the same number of times as previous pulses, the central processing unit returns to step 560 and proceeds as previously described. However, if the pulse group counter equals the number of repetitions of prior pulses so that the repeating pattern, as thus far established, has been repeated an equal number of times in the CTA, the central processing unit proceeds to steps 582 and 584 as previously described.

When, at step 584, the pulse group counter exceeds the number of pulses in the pattern minus one, all the pulses in the proposed repeating pattern have been examined in steps 552 through 584 and the operation of the central processing unit 12 proceeds to step 588. The CTA pulse counter, which was continuously incremented at step 574, is compared with unity to insure that a degenerated pattern containing one or no pulses has not been encountered. If the CTA pulse counter is less than or equal to unity, there is no repeating pattern in the CTA and the operation of the central processing unit returns to step 560 to proceed as previously described. If, at step 588, the CTA pulse counter is greater than unity, step 590 determines whether the CTA pulse counter is also equal to the difference of the number of entries in the CTA less the number of pulses in the proposed pulse repetition pattern. This comparison is made to determine whether there are pulses remaining in the CTA which are unaccounted for by the progressive repetition of the proposed repeating pattern through the CTA. If the CTA pulse counter does not equal the difference of the number of entries in the CTA less the number of pulses in the repeating pattern, the central processing unit again returns to step 560 but, if the CTA pulse counter does equal this difference, all the criteria which were previously set forth as being necessary to establish that a repeating pulse pattern is contained within the CTA have been satisfied. Accordingly, the central processing unit proceeds to step 592 in which the stagger level of the threat signal is set equal to the number of pulses in the repeating pulse pattern and the cycle time of the threat signal is set equal to the cycle of the pattern. At step 564, the central processing unit then returns to step 328 in the flow chart of FIG. 13 having found the smallest repeating pattern in the CTA. The first repeating pattern to be found will be the smallest repeating pattern since all of the possible repeating patterns are tested against the pulses of the CTA starting with the smallest possible repeating pattern of two pulses until a repeating pattern is found or it is no longer possible to satisfy all of the criteria necessary to establish a smaller repeating pattern within the CTA.

For a more complete description of the operation of the central processing unit 12 in accordance with the flow charts of FIGS. 13-18, a program listing describing the operation of the central processing unit 12 in greater detail is set forth in Appendix A.

From the foregoing description, it will be recognized that a threat signal detection system for detecting threat signals having at least one beam has been described in which a receiver detects the incidence of signals, and in which a controller condenses threat signals from harmonically related beams of a pulse group detected by the receiver. Therefore, this threat signal detection system has the capability of accurately detecting threat signals despite the presence of harmonically related beams that are sorted from the group of pulses detected by the receiver. The disclosed threat signal detection system therefore avoids the detection of spurious threat signals while accurately detecting threat signals which are, in fact, present.

WESTINGHOUSE MILLI ASSEMBLER

```
73   325 10 4 3 167 + 75                LD     MQ,(0)               . NO
                                        RETL   S3INDIVX             . YES,MQ HAS THE QUOTIENT .
73   326 10 6 3   5 + 75
76     0                     $(S5CBNI)
75                                      LIT    S5DBNI
                             S5STAGC*   ENTL   S5STAGCX,BIDBNI,S5CBNI
65    22
65    22
76     3
76     0 11 5 3  27 + 65
                                                                    . ROUTINE TO CONDENSE STAGGERLEVEL OF
                                                                    .      PULSE TRAINS FROM SORT
76     1 10 5 0 131 + 65                LD     IX,BIS3DBA
76     2  1 5 0   6                     XB     IX
76     3  3 1 0   5                     TNZ    A1                   . ANY TRAINS IN A LIST
76     4  5 0 0 124 + 76                J      S5NTRN               . NO, DONE
76     5 11 1 0  51 + 75                ST     A1,S5ATOP
76     6 11 1 0  57 + 75                ST     A1,S5TEMPA           . BEGINNING POINTER TO LIST A
76     7 10 1 0 166 + 75                LD     A1,(S3ATOP-S3DBNI*/8-BIIBITN)
76    10 11 1 0  27 + 75                ST     A1,S3NEXTB
76    11 10 5 0  57 + 75     S5STAGC1   LD     IX,S5TEMPA
76    12 10 3 1  16                     LD,    A3,HIIHMULT          . NUMBER OF HARMONICLY RELATED TRAINS IN THIS
76    13  7 3  7  1                     SRL    A3,8                 .      GROUP OF TRAINS
76    14  3 3 0   5                     TNZ    A3                   . HARMONIC ENTRY NUMBER = 0?
76    15  5 0 0 127 + 76                J      S5STAGC2             . YES, ADVANCE TO NEXT TRAIN IN LIST A
76    16 11 3 0  55 + 75                ST     A3,S5ENTNO
                                        JSL    S5LCM                . ROUTINE TO FIND LEAST COMMON MULTIPLE FOR
76    17 10 5 0 201 + 75
76    20 10 6 0 202 + 75
                                                                    .      THIS GROUP OF HARMONICLY RELATED TRAINS
76    21 10 5 0  57 + 75                LD     IX,S5TEMPA
76    22 10 0 1  17                     LD,    A0,HIIBGCD           . LOWEST PRI OF THIS GROUP
76    23 14 0 0  56 + 75                M      A0,S5PPROD           . LEAST COMMON MULTIPLE FOR GROUP
76    24  2 4  0  1                     SRL    MQ,1
76    25 11 4 0  60 + 75                ST     MQ,S5CYCTIM          . CYCLE TIME =LOW TOA + LOW PRI * LCM
76    26 10 0 1   4                     LD,    A0,BIIBSTAG          .
76    27 11 0 0  61 + 75                ST     A0,S5TOA1            . TOA OF LOW PRI OF GROUP(OFFSET)
76    30 10 0 0 160 + 75                LD     A0,(0)
76    31 11 0 1   4                     ST,    A0,BIIBSTAG          . OFFSET THE FIRST ENTRY
76    32 10 3 0  55 + 75                LD     A3,S5ENTNO
76    33 13 3 0 157 + 75                S      A3,(1)
                                        JSL    S5SNTOA              . ROUTINE TO STANDARDIZE TOA'S OF GROUP TO BE
76    34 10 5 0 203 + 75
76    35 10 6 0 204 + 75
                                                                    .      BETWEEN LOW TOA AND CYCLE TIME
76    36 10 3 0  55 + 75                LD     A3,S5ENTNO
                                        JSL    S5CREAT              . FORM CYCLE TIME ARRAY BY LAYING OUT TRAINS
76    37 10 5 0 205 + 75
76    40 10 6 0 206 + 75
                                                                    .      AT THE PROPER PRI
                                        JSL    S5ORDER              . ROUTINE TO ORDER TOA'S OF LIST B AND DROP
```

WESTINGHOUSE MILLI ASSEMBLER

```
76   41  10  5  0  207 + 75
76   42  10  6  0  210 + 75
                                                         *    DUPLICATES
                                       JSL       SSPATFN      *  ROUTINE TO FIND SMALLEST REPEATING PATTERN
76   43  10  5  0  211 + 75
76   44  10  6  0  212 + 75
                                                         *       IN CYCLE TIME ARRAY
76   45  10  5  0   57 + 75            LD        IX,SSTEMPA
76   46  11  4  1    2                 ST,       MU,B11BPR;
76   47  10  1  0  160 + 75            LD        AI,(0)       * COMPUTE PRIAVG=NEW C.T./(NR. PULSES)
76   50  11  0  0   51 + 75            ST        AU,SSTEMP
76   51  15  1  0   51 + 75            D         AI,SSTEMP
76   52  13  0  0  157 + 75            S         AO,(1)
76   53   2  4  0    2                 SLL       MU,1         * DONE
76   54  11  4  0   51 + 75            ST        MU,SSTEMP
76   55  10  1  0   57 + 75            LD        AI,SSMAXDIF  * COMPUTE STGR.RNG.=SSMAXDIF-PRIAVG
76   56  13  1  0   51 + 75            S         AI,SSTEMP
76   57   3  1  0    1                 TLZ       AI           * TAKE THE ABSOLUTE VALUE
76   60   5  0  0   63 + 76            J         $+3          * POSITIVE
76   61  16  1  0  161 + 75            N         AI,(-1)      * NEGATIVE
76   62  12  1  0  157 + 75            A         AI,(1)
76   63  11  1  0   51 + 75            ST        AI,SSTEMP    * DONE
76   64   2  0  7    2                 SLL       AG,8         * INPUT THE STAGGER LEVEL AND STAGGER RANGE
76   65   2  0  2    2                 SLL       AG,3         * INTO B11BSTAG
76   66  12  0  0   51 + 75            A         AG,SSTEMP
76   67  11  0  1    4                 ST,       AO,B11BSTAG  * DONE
76   70  10  5  0   27 + 75            LD        IX,S3NEXTB   * ADD BEAM TO LIST B
76   71  10  0  0   57 + 75            LD        AU,SSTEMPA
76   72  11  0  1   11                 ST,       AG,B11BITN   * DONE
76   73  11  0  0   27 + 75            ST        AG,S3NEXTB   * S3NEXTB POINTS TO THE NEXT ENTRY IN LISTB
76   74  10  3  0   56 + 75            LD        A3,SSENTNO   * SET UP LOOP COUNTER FOR SSFRENXT LOOP
76   75  13  3  0  157 + 75            S         A3,(1)       * DONE
76   76  10  5  0   57 + 75  SSFRENXT  LD        IX,SSTEMPA   *    LOOP TO FREE ALL OTHER TRAINS IN THIS
76   77  10  0  1   11                 LD,       AG,B11BITN   *  HARMONIC GROUP
76  100   3  0  0    5                 TNZ       AO           *     IS THIS THE LAST TRAIN IN LISTA
76  101   5  0  0  120 + 76            J         SSLAST       *    YES
76  102  11  0  0   57 + 75            ST        AG,SSTEMPA   *    NO,FREE IT
76  103  12  0  0  174 + 75            A         AG,(S3DBNI*/8)
76  104  10  5  0  105 + 75            LD        IX,S3HDRA
76  105   1  5  0                      XB        IX
65                                     LIT       B1DFNI
                                       JSL       S4FREIB
76  106  10  5  0  277 + 65
76  107  10  6  0  237 + 65
76  110  10  5  0  101 + 65            LD        IX,B1S3DBA
76  111   1  5  0                      XB        IX
75                                     LIT       S3DBNI
76  112   4  3  0   14                 JC        A3,$-SSFRENXT    END OF SSFRENXT LOOP.
76  113  10  5  0   57 + 75            LD        IX,SSTEMPA
76  114  10  5  1   11                 LD,       IX,B11BITN
76  115  11  5  0   57 + 75            ST        IX,SSTEMPA
```

```
WESTINGHOUSE MILLI ASSEMBLER

76  116  3 5 0    7                       TEZ    IX                    . ANY MORE TRAINS
76  117  5 0 0   11 + 76                  J      SSSTAGC1              . LOOK AT THE NEXT HARMONIC GROUP
76  120 10 5 0   22 + 75     SSLAST       LD     IX,S3NEXTB            . TERMINATE LISTB
76  121 10 0 0  106 + 75                  LD     A0,(0)
76  122 11 0 1   11                       ST,    A0,B11BITN            . DONE
76  123 10 1 0   16 + 75     SSOUT        LD     A1,S3BTOP             . BLIST IS THE NEW WORKING LIST
76  124 10 5 0  105 + 75     SSRTRN       LD     IX,S3BDBA
76  125  1 5 0    6                       XB     IX
                                          RETL   SSSTAGCX              . RETURN TO BATCH
76  126 10 . 0   22 + 65
76  127 10 0 0  166 + 75     SSSTAGC2     LD     A0,(0)                . NON-STAGGERED TRAIN
76  130 11 0 1    4                       ST,    A0,B11BSTAG
76  131 10 5 0   22 + 75                  LD     IX,S3NEXTB            . PLACE BEAM ON LISTB
76  132 10 0 0   52 + 75                  LD     A0,SSTEMPA
76  133 11 0 1   11                       ST,    A0,B11BITN
76  134 11 0 0   22 + 75                  ST     A0,S3NEXTB            . DONE
76  135 10 5 0   52 + 76                  LD     IX,SSTEMPA
76  136 10 0 1   11                       LD,    A0,B11BITN
76  137  3 0 0    5                       TNZ    A0                    . IS THIS THE LAST TRAIN
76  140  5 0 0  123 + 76                  J      SSOUT                 . YES, RETURN TO BATCH
76  141 11 0 0   52 + 75                  ST     A0,SSTEMPA
76  142  5 0 0   11 + 76                  J      SSSTAGC1              . NO, LOOK AT THE NEXT HARMONIC GROUP
76  143                      $(SSCBN1)
75                                        LIT    SSDBN1
                             SSLCM                                     . ROUTINE TO DETERMINE LEAST COMMON MULTIPLE
                                                                       .       FOR A GROUP OF HARMONICLY RELATED PULSES
                                          ENTL   SLCMX,SSDBN1,SSCBN1
75    6
75    6
76  143
76  143 11 5 0    6 + 75
76  144 13 3 0  157 + 75                  S      A3,(1)                . SET UP THE LOOP COUNTER FOR THE SSLCM1 LOOP
76  145 10 5 0   52 + 75                  LD     IX,SSTEMPA            . GET THE TRAIN ON TOP OF THE HARMONIC GROUP
76  146 10 0 1   16                       LD,    A0,B11BMULT           . GET ITS MULT NR.
76  147  2 0 7    7                       SLL    A0,8
76  150  2 0 7    1                       SRL    A0,6
76  151 11 0 0   56 + 75                  ST     A0,SSPPROD            . SAVE THE MULT NR. IN SSPPROD
76  152 10 5 1   11          SSLCM1       LD,    IX,B11BITN            .    GET THE NEXT TRAIN IN THE HARMONIC GROUP
76  153 10 0 1   16                       LD,    A0,B11BMULT           .    SSA=MAX(SSPPROD,B11BMULT(IX))
76  154  2 0 7    7                       SLL    A0,8                  .    SSB=MIN(SSPPROD,B11BMULT(IX))
76  155  2 0 7    1                       SRL    A0,8
76  156 13 0 0   56 + 75                  S      A0,SSPPROD
76  157  3 0 0    6                       TGEZ   A0
76  160  5 0 0  166 + 76                  J      SSPRODGT
76  161 10 0 1   16                       LD,    A0,B11BMULT
76  162  2 0 7    7                       SLL    A0,8
76  163  2 0 7    1                       SRL    A0,8
76  164 10 1 0   56 + 75                  LD     A1,SSPPROD
76  165  5 0 0  173 + 76                  J      SSSAVEAB
76  166 10 1 1   16          SSPRODGT     LD,    A1,B11BMULT
76  167  2 1 7    7                       SLL    A1,8
```

WESTINGHOUSE MILLI ASSEMBLER

```
7853.   76  170  2 1 0 7    1                SRL    A1,8
7854.   76  171 10 0 0  56 + 75              LD     AO,SSPPROD
7855.   76  172 11 0 0 102 + 75  SSSAVEAB    ST     AO,SSA
7856.   76  173 11 1 0 103 + 75              ST     A1,SSB       .  DONE
7857.   76  174 14 0 0 103 + 75              M      AO,SSB       .  UNADJUSTED PPROD=SSA*SSB
7858.   76  175  2 4 0   1                   SRL    MQ,1
7859.   76  176 11 4 0  56 + 75              ST     MQ,SSPPROD   .  DONE
7860.   76  177 10 4 0 102 + 75  SSLCM2      LD     MQ,SSA       .     LOOP TO DETERMINE THE GREATEST COMMON
7861.   76  200  2 4 0   7                   SLL    MQ,1         .      DIVISOR OF 2 NRS.,SSA AND SSB WHERE
7862.   76  201 10 0 0 160 + 75              LD     AO,(0)       .      SSA .GE.SSB. WHEN EXITING FROM THE LOOP
7863.   76  202 15 0 0 103 + 75              D      AO,SSB       .      SSB  IS THE GREATEST COMMON DIVISOR
7864.   76  203  3 0 0   4                   TGEZ   AO           .       CORRECT THE REMAINDER
7865.   76  204 12 0 0 103 + 75              A      AO,SSB       .      YES
7866.   76  205 11 0 0 104 + 75              ST     AO,SSC       .      SSC=MOD(SSA,SSB)
7867.   76  206  3 0 0   5                   TNZ    AO
7868.   76  207  5 0 0 215 + 76              J      SSLCM3       .      EXIT SSLCM2 LOOP
7869.   76  210 10 0 0 103 + 75              LD     AO,SSB
7870.   76  211 11 0 0 102 + 75              ST     AO,SSA
7871.   76  212 10 0 0 104 + 75              LD     AO,SSC
7872.   76  213 11 0 0 103 + 75              ST     AO,SSB
7873.   76  214  5 0 0 177 + 76              J      SSLCM2       .      CONTINUE SSLCM2 LOOP UNTIL SSC=0
7874.   76  215 10 4 0  56 + 75  SSLCM3      LD     MQ,SSPPROD   .   ADJUSTED PPROD=UNADJUSTED PPROD/SSB
7875.   76  216  2 4 0   7                   SLL    MQ,1
7876.   76  217 10 0 0 160 + 75              LD     AO,(0)
7877.   76  220 15 0 0 103 + 75              D      AO,SSB
7878.   76  221 11 4 0  56 + 75              ST     MQ,SSPPROD   .   DONE
7879.   76  222  4 3 0  56                   JC     AJ,$-SSLCM1  .   LOOK AT THE NEXT TRAIN IN THE GROUP
7880.                                        RETL   SSLCMX       .  DONE, LCM IN SSPPROD
7880.   76  223 10 6 0   4 + 75
7881.   76  224                  $(SSCBN1)
7882.   75                                   LIT    SSDBN1
7883.                            SSSNTOA                         . ROUTINE TO STANDARDIZE TOA'S TO FALL WITHIN
7884.                                                            .    THE LIMITS OF THE CYCLE TIME FOR THIS
7885.                                                            .     HARMONICLY RELATED PULSES
7886.                                        ENTL   SSSNTOAX,SSDBN1,SSCBN1
7886.   75    7
7886.   75    7
7886.   76  224
7886.   76  224 11 5 0   7 + 75
7887.   76  225 10 5 0  57 + 75              LD     IX,SSTEMPA   . BEGINNING ADDRESS OF THIS GROUP OF TRAINS
7888.   76  226 10 5 1  11       SSSNTOA1    LD,    IX,B11BITN   . ADDRESS OF NEXT TRAIN IN GROUP
7889.   76  227 10 0 1   4                   LD,    AO,B11BSTAG  . TOA OF NEXT TRAIN(TOA2 IN THE COMMENTS)
7890.   76  230 13 0 0  61 + 75              S      AO,SSTOA1    . OFFSET TOA2 WITH RESPECT TO TOA1
7891.   76  231 10 1 1   2                   LD,    A1,B11BPRI   . PRI OF NEXT TRAIN
7892.   76  232 11 1 0  63 + 75              ST     A1,SSPRI2
7893.   76  233  3 0 0   4       SSSNTOA2    TGEZ   AO           . TOA2 .LT. LOWEST TOA?
7894.   76  234  5 0 0 237 + 76              J      SSSNTOA3     . YES
7895.   76  235 13 0 0  63 + 75              S      AO,SSPRI2
7896.   76  236  5 0 0 233 + 76              J      SSSNTOA2
7897.   76  237 12 0 0  63 + 75  SSSNTOA3    A      AO,SSPRI2
7898.   76  240  3 0 0   4                   TGEZ   AO           . TOA2 .GE. LOWEST TOA?
```

WESTINGHOUSE MILLI ASSEMBLER

```
76   241   5 0 0  237 + 76              J      SSSNTOA3          . NO
76   242  13 0 0   60 + 75              S      A0,SSCYCTIM
76   243   3 0 0    3                   TLEZ   A0                . NEW TOA .LE. CYCLE TIME OF THIS GROUP
76   244   5 0 0  244 + 76              J      $                 . NO, HALT
76   245  12 0 0   60 + 75              A      A0,SSCYCTIM       . YES, SET TOA OF TRAIN IN LIST A TO TOA2
76   246  11 0 1    4                   ST.    A0,B11BSTAG
76   247   4 3 0   21                   JC     A3,$-SSSNTOA1     . REPEAT FOR NEXT TRAIN IN GROUP
                                        RETL   SSSNTOAX          . RETURN TO CALLING ROUTINE
76   250  10 6 0    7 + 75
76   251                        $(SSCBN1)
75                                      LIT    SSDBN1
                                SSCREAT                          . ROUTINE TO CREATE CYCLE TIME ARRAY OF PULSES
                                                                 .      BY FILLING IN THE MISSING PULSES AT
                                                                 .      THE PROPER PRI'S
                                        ENTL   SSCREATX,SSDBN1,SSCBN1
75    10
75    10
76   251
76   251  11 5 0   10 + 75              .
76   252  10 5 0  213 + 75              LD     IX,(SSLISTB-SSDBN1*/8)
76   253  11 5 0   54 + 75              ST     IX,SSTEMP1        . SSTEMP1 IS A POINTER IN THE C.T.A.
76   254  10 5 0   52 + 75              LD     IX,SSTEMPA        . BEGINNING ADDRESS OF THIS GROUP OF TRAINS
76   255  11 5 0   53 + 75              ST     IX,SSTEMP         . SSTEMP IS A POINTER IN THE LINK LIST
76   256  10 2 0  100 + 75              LD     A2,(0)
76   257  10 3 1    4       SSCREAT1    LD.    A0,B11BSTAG       . TOA OF NEXT TRAIN
76   260  10 1 1    2                   LD.    A1,B11BPRI        . PRI OF NEXT TRAIN
76   261  11 1 0   63 + 75              ST     A1,SSPRI2
76   262  10 5 0   54 + 75              LD     IX,SSTEMP1
76   263  13 0 0   60 + 75  SSCREAT2    S      A0,SSCYCTIM
76   264   3 0 0    1                   TLZ    A0                . LOW PRI * LCM.LE. TOA2
76   265   5 0 0  300 + 76              J      SSCREAT3          . NO, ADVANCE TO NEXT TRAIN
76   266  12 0 0   60 + 75              A      A0,SSCYCTIM
76   267  11 0 1    0                   ST.    A0,0              . PUT TOA2 IN LIST B
76   270  12 5 0  157 + 75              A      IX,(1)
76   271  12 2 0  157 + 75              A      A2,(1)
76   272  13 2 0   64 + 75              S      A2,SSBMAX
76   273   3 2 0    1                   TLZ    A2                . ANY MORE ROOM IN B LIST
76   274   5 0 0  274 + 76              J      $                 . NO. TEMPORARY HALT FOR DEBUG
76   275  12 2 0   64 + 75              A      A2,SSBMAX         . YES
76   276  12 0 0   63 + 75              A      A0,SSPRI2
76   277   5 0 0  263 + 76              J      SSCREAT2
76   300  11 5 0   54 + 75  SSCREAT3    ST     IX,SSTEMP1
76   301  10 5 0   53 + 75              LD     IX,SSTEMP
76   302  10 5 1   11                   LD.    IX,B11BITN        . LINK ADDRESS OF NEXT TRAIN OF GROUP
76   303  11 5 0   53 + 75              ST     IX,SSTEMP
76   304   4 3 0   26                   JC     A3,$-SSCREAT1     . REPEAT FOR NEXT PULSE
76   305  11 2 0   65 + 75              ST     A2,SSBNO          . NUMBER OF TOA'S    IN LIST B
                                        RETL   SSCREATX          . RETURN TO CALLING ROUTINE
76   306  10 6 0   10 + 75
77     0                        $(SSCBN2)
75                                      LIT    SSDBN1
```

WESTINGHOUSE MILLI ASSEMBLER

```
75    11
75    11
77    0
77    0  11  5  0   11 + 75

77    1  10  0  0   65 + 75
77    2  10  1  0  214 + 75

77    3  10  5  0  216 + 75
77    4  10  6  0  216 + 75
77    5  10  2  0  162 + 75
77    6  11  2  0   57 + 75
77    7  10  5  0  213 + 75
77   10  10  3  0   65 + 75
77   11  13  3  0  156 + 75
77   12  10  0  1    1
77   13  13  0  1    2
77   14  11  0  0   53 + 75
77   15  13  0  0   57 + 75
77   16   3  0  0    4
77   17   5  0  0   22 + 77
77   20  10  0  0   53 + 75
77   21  11  0  0   57 + 75
77   22  10  0  0   53 + 75
77   23  13  0  0   77 + 75
77   24   3  0  0    3
77   25   5  0  0   31 + 77
77   26  10  0  0   67 + 75
77   27  11  0  1    0
77   30  12  2  0  157 + 75
77   31  12  5  0  157 + 75
77   32   4  3  0   20
77   33  10  0  0   65 + 75
77   34  10  1  0   65 + 75
77   35  11  2  0   53 + 75
77   36  13  1  0   53 + 75
77   37  11  1  0   65 + 75
77   40  10  1  0  210 + 75

77   41  10  5  0  217 + 75
77   42  10  6  0  216 + 75
```

```
SSORDER                                . ROUTINE TO ORDER LIST B BY INCREASING TOA'S
                                       .       AND DROP ANY DUPLICATE TOA'S
          ENTL      SSORDERX,SSDBN1,SSCBN2


 . THIS ROUTINE WILL MAKE THREE PASSES.
 .  1) IN THE FIRST PASS IT WILL DO A REGULAR SHELL SORT ON LISTB.
 .  IN THE SECOND PASS IT WILL EXAMINE ADJACENT ENTRIES. THE MAX(PULSE(I)-
 . PULSE(I-1)) WILL BE REMEMBERED IN SSMAXDIF. IN ORDER TO ELIMINATE DUPLICATES
 . THE FIRST OF A PAIR OF EQUAL ENTRIES WILL BE SET TO LARGE VALUE. THE NR.
 . OF DUPLICATES WILL BE REMEMBERED.
 .  IN THE THIRD PASS ANOTHER SHELL SORT WILL BE PERFORMED IN ORDER TO ELIMINATE
 . DUPLICATES. SSBNO WILL BE DECREMENTED BY THE NR. OF DUPLICATES FOUND.
          LD        A0,SSBNO          . NR. OF ITEMS IN THE CYCLE TIME ARRAY (C.T.A.)
          LD        A1,(SSLISTB-SSDBN1*/8-1) . ADDRESS OF THE C.T.A.-1
          JSL       SSSHELS           . DO A SHELL SORT ON C.T.A.


          LD.       A2,(0)            . A2 IS A DUPLICATE COUNTER
          ST        A2,SSMAXDIF       .
         LD         X,(SSLISTB-SSDBN1*/8) . ADDRESS OF CYCLE TIME ARRAY
          LD        A3,SSBNO
          S         A3,(2)            . SET UP THE LOOP COUNTER FOR THE SSNXTPR LOOP
SSNXTPR   LD.       A0,1              . COMPUTE THE DIFF. FOR THE NEXT PAIR
          S.        A0,0              .
          ST        A0,SSTEMP         . SAVE IT IN TEMP
          S         A0,SSMAXDIF       .
          TGZ       A0                . DO WE HAVE A NEW MAX. DIFF. ?
          J         SSDUPLCK          . NO, CHECK FOR DUPLICATES
          LD        A0,SSTEMP         . YES, SAVE THE NEW MAX. DIFF.
          ST        A0,SSMAXDIF       .
SSDUPLCK  LD        A0,SSTEMP         .
          S         A0,SSCTTOL        .
          TLEZ      A0                . DO WE HAVE A DUPLICATE PAIR ?
          J         SSIXINCR          . NO, TRY NEXT PAIR
          LD        A0,SSCYCTIM       . YES, TAG THE FIRST ONE OF THE PAIR WITH C.T.
          ST.       A0,0              .
          A         A2,(1)            . INCREMENT DUPLICATE COANTER
SSIXINCR  A         IX,(1)            .
          JC        A3,*-SSNXTPR
SSPASS3   LD        A0,SSBNO          .
          LD        A1,SSBNO          . DECREMENT THE LIST BY THE NR. OF DUPLICATES
          ST        A2,SSTEMP         .
          S         A1,SSTEMP         .
          ST        A1,SSBNO          . DONE
          LD        A1,(SSLISTB-SSDBN1*/8-1) . ADDRESS OF THE C.T.A.-1
          JSL       SSSHELS           . DO THE THIRD PASS TO ELIMINATE DUPLICATES
```

WESTINGHOUSE MILLI ASSEMBLER

```
77   43 10 5 0 214 + 75                 LD       IX,(SSLISTR-SSDBN1*/8-1)
77   44 12 5 0  65 + 75                 A        IX,SSBNO      . GET THE MAXIMUM TOA IN THE C.T.A.
77   45 10 0 1   0                      LD.      A0,0
77   46 11 0 0 101 + 75                 ST       A0,SSMAXTOA   . DONE
                                        RETL     SSORDERX      . RETURN TO CALLING ROUTINE
77   47 10 6 0  11 + 75
77   50                     $(SSCBN2)
75                                      LIT      SSDBN1
                            SSSHELS*    ENTL     SSSHELSX,SSDBN1,SSCBN2
75   12
75   12
77   50
77   50 11 5 0  12 + 75
                            .
                            . SHELS PERFORMS A SHELL SORT. THE INPUTS ARE
                            .    THE LENGTH OF THE ARRAY,PASSED IN A0
                            .    THE ADDRESS OF THE ARRAY-1 PASSED IN A1
                            .
77   51 11 0 0  74 + 75                 ST       A0,SSSIZE
77   52 11 0 0  67 + 75                 ST       A0,SSI        . SAVE THE SIZE OF THE ARRAY
77   53 11 1 0  75 + 75                 ST       A1,SSLISTA    . SAVE THE ADDRESS
77   54 10 0 0  67 + 75     SSNEWI      LD       A0,SSI        . SSI IS THE COMPARATION DISTANCE
77   55 13 0 0 157 + 75                 S        A0,(1)
77   56  3 0 0   4                      TGZ      A0            . ARE WE DONE
                                        RETL     SSSHELSX      . YES
77   57 10 6 0  17 + 75                 A        A0,(2)        . NO, COMPUTE A NEW SSI
77   60 12 0 0 154 + 75                 SRL      A0,1
77   61  2 0 0   1                      ST       A0,SSI        . SSI=INT(SSI/2)
77   62 11 0 0  67 + 75                 LD       A0,SSSIZE
77   63 10 0 0  74 + 75                 S        A0,SSI
77   64 13 0 0  67 + 75                 ST       A0,SSJMAX     . SSJMAX IS THE LAST NR. TO BE COMPARED
77   65 11 0 0  74 + 75                 LD       A3,(1)
77   66 10 3 0 157 + 75     SSSETIX     LD       IX,SSLISTA
77   67 10 5 0  75 + 75     SSNEWJSV    ST       A3,SSJ        . SSJ POINTS TO THE ELEMENT BEING COMPARED
77   70 11 3 0  76 + 75     SSNEWJ      A        IX,SSJ
77   71 12 5 0  76 + 75                 LD.      A0,0
77   72 10 0 1   0                      A        IX,SSI
77   73 12 5 0  67 + 75                 LD.      A1,0
77   74 10 1 1   0                      ST       A0,SSTEMP     . A0 AND A1 CONTAIN THE COMPARATION PAIR
77   75 11 0 0  53 + 75                 ST       A1,SSTEMP1
77   76 11 1 0  54 + 75                 S        A1,SSTEMP
77   77 13 1 0  53 + 75                 TLLZ     A1            . PROPER ORDER
77  100  3 1 2   3                      J        SSORDROK      . YES
77  101  5 0 0 114 + 77                 ST.      A0,0          . NO, INTERCHANGE THE PAIR
77  102 11 0 1   0                      LD       A0,SSTEMP1
77  103 10 0 0  54 + 75                 S        IX,SSI
77  104 13 5 0  67 + 75                 ST.      A0,0          . DONE
77  105 11 0 1   0                      S        IX,SSJ        . RESET IX
77  106 13 5 0  76 + 75                 LD       A0,SSJ        . ATTEMPT TO FLOAT UP THE INTERCHANGED NR.
77  107 10 0 0  76 + 75                 S        A0,SSI
77  110 13 0 0  67 + 75
```

WESTINGHOUSE MILLI ASSEMBLER

```
77   111  11 0 2   72 + 75               ST     AO,SSJ
77   112   3 0 0    1                    TLEZ   AO               . CAN WE TRY TO FLOAT IT HIGHER
77   113   5 0 0   71 + 77               J      SSNEWJ           . YES
77   114  12 3 0  157 + 75   SSORDROK    A      A3,(1)           . NO,RESUME FORWARD CHECKING (POINTER IN A3)
77   115  13 3 0   74 + 75               S      A3,SSJMAX
77   116   3 3 0    1                    TLEZ   A3               . DID WE FINISH CHECKING FOR THIS SSI
77   117   5 0 0   54 + 77               J      SSNEWI           . YES,TRY A NEW DISTANCE
77   120  12 3 0   74 + 75               A      A3,SSJMAX        . NO,RESET A3 AND
77   121   5 0 0   67 + 77               J      SSSFTIX          . CONTINUE FORWARD CHECKING
77   122                     $(SSCHN2)
75                                       LIT    SSDBNI
                             SSPATFN                             . ROUTINE TO FIND THE SMALLEST REPEATING
                                                                 .      PATTERN FROM THE CYCLE TIME ARRAY
                                         ENTL   SSPATFNX,SSDBNI,SSCHN2
75    13
75    13
77   122
77   122  11 5 0   11 + 75
77   123  10 0 0  160 + 75               LD     AC,(0)
77   124  11 0 0   66 + 75               ST     AO,SSGPCNT       . GROUP COUNTER = NO. OF PULSES IN PATTERN
77   125  10 0 0   66 + 75   SSNEWGC     LD     AO,SSGPCNT
77   126  12 0 0  157 + 75               A      AO,(1)
77   127  11 0 0   66 + 75               ST     AO,SSGPCNT       . INCREMENT GROUP COUNTER BY ONE
77   130  10 0 0  160 + 75               LD     AO,(0)           . ZERO COUNTERS
77   131  11 0 0   67 + 75               ST     AO,SSI
77   132  11 0 2   72 + 75               ST     AC,SSJ
77   133  10 5 0  211 + 75               LD     IX,(SSLISTB-SSDBNI*/8) . ADDRESS OF CYCLE TIME ARRAY
77   134  12 5 0   66 + 75               A      IX,SSGPCNT
77   135  10 0 1    0                    LD*    AC,0             . TOA(GROUP COUNTER+1)
77   136  11 0 0   71 + 75               ST     AO,SSNEWCT       . NEW CYCLE TIME
77   137  12 0 0  101 + 75               A      AO,SSMAXTOA
77   140  13 0 0   60 + 75               S      AO,SSCYCTIM
77   141   3 0 0    6                    TGEZ   AO               . IS NEWCT+MAXTOA .GE. CYCTIM
77   142   5 0 0  211 + 77               J      SSGCTST          . NO, WE NEED A BIGGER NEWCT
77   143  10 5 0  213 + 75   SSNEWTJ     LD     IX,(SSLISTB-SSDBNI*/8) . ADDRESS OF CYCLE TIME ARRAY
77   144  12 5 0   72 + 75               A      IX,SSJ
77   145  10 0 1    0                    LD*    AC,0             . TOA(J)
77   146  11 0 0   72 + 75               ST     AO,SSTEMPCT      . TEMPORARY CYCLE TIME
77   147  10 5 0  211 + 75               LD     IX,(SSLISTB-SSDBNI*/8) . ADDRESS OF CYCLE TIME ARRAY
77   150  12 5 0   66 + 75               A      IX,SSGPCNT
77   151  12 5 0   70 + 75               A      IX,SSJ
77   152  11 5 0   73 + 75               ST     IX,SSNXTLUK      . NEXT PLACE IN C.T.A. TO LOOK FOR TEPCT
77   153  10 2 0  160 + 75               LD     A2,(0)           . COUNTER FOR THE NR. OF REPEATING PATTERNS
77   154  10 0 0   72 + 75   SSNEWPND    LD     AO,SSTEMPCT
77   155  12 0 0   71 + 75               A      AO,SSNEWCT
77   156  11 0 0   72 + 75               ST     AO,SSTEMPCT      . TEMP CYCLE TIME = TEMP C.T. + NEW CYCLE TIME
77   157  13 0 0  101 + 75               S      AO,SSMAXTOA      . MAXIMUM TOA IN THE C.T.A.
77   160   3 0 0    3                    TLEZ   AO               . TEMP C.T. .GT. ARRAY CYCLE TIME
77   161   5 0 0  221 + 77               J      SSPATFN6         . YES,END OF CHECK FOR PULSES LOOP
77   162  10 5 0   73 + 75               LD     IX,SSNXTLUK      . LOOK FOR PULSE AT THIS CYCLE TIME
77   163  10 0 1    0       SSPATFN3    LD*    AO,0             . TOA OF NEXT PULSE
```

WESTINGHOUSE MILLI ASSEMBLER

```
8079.   77  164 13 0 0  72 + 75            S     AO,SSTEMPCT    . TOA - TEMP CYCLE TIME
8080.   77  165  3 0 0   1                 TLZ   AO             . VALUE NEGATIVE?
8081.   77  166  5 0 0 171 + 77            J     SSPATFN4       . NO, CONTINUE
8082.   77  167 16 0 0 161 + 75            N     AO,(-1)        . TAKE THE ABSOLUTE VALUE
8083.   77  170 12 0 0 157 + 75            A     AO,(1)
8084.   77  171 13 0 0  77 + 75  SSPATFN4  S     AO,SSCTTOL     . ALLOWED DELTA FROM
8085.   77  172  3 0 0   3                 TLEZ  AO             . NEXT PULSE'S TOA WITHIN DELTA OF PRED. TIME?
8086.   77  173  5 0 0 203 + 77            J     SSPATFN5       . NO, TRY NEXT PULSE IN ARRAY
8087.   77  174 10 0 0  67 + 75            LD    AO,SSI         . YES, INCREMENT PULSE COUNTER
8088.   77  175 12 0 0 157 + 75            A     AO,(1)
8089.   77  176 11 0 0  67 + 75            ST    AO,SSI
8090.   77  177 12 2 0 157 + 75            A     A2,(1)         . INCREMENT THE REPEATING PATTERN COUNTER
8091.   77  200 12 5 0 157 + 75            A     IX,(1)
8092.   77  201 11 5 0  73 + 75            ST    IX,SSNXTLUK    . NEXT PLACE IN C.T.A. TO LOOK FOR TEPCT
8093.   77  202  5 0 0 15? + 77            J     SSNEWPRD
8094.   77  203 10 0 1   ?       SSPATFN5  LD,   AO,0           . TOA OF NEXT PULSE
8095.   77  204 13 0 0  72 + 75            S     AO,SSTEMPCT    . TOA - TEMP CYCLE TIME
8096.   77  205  3 0 0   1                 TLZ   AO             . DID WE OVERSHOOT THE PREDICTED TOA
8097.   77  206  5 0 0 211 + 77            J     SSGCTST        . YES,NO PULSES FOUND AT THE PREDICTED TIME
8098.   77  207 12 5 0 157 + 75            A     IX,(1)         . NO, LOOK AT THE NEXT ENTRY IN THE ARRAY
8099.   77  210  5 0 0 167 + 77            J     SSPATFN3
8100.   77  211 10 0 0  60 + 75  SSGCTST   LD    AO,SSBNO
8101.   77  212  2 0 0   1                 SRL   AO,1
8102.   77  213 13 0 0  64 + 75            S     AO,SSGPCNT
8103.   77  214  3 0 0   3                 TLEZ  AO             . ANY MORE GROUPS TO LOOK AT
8104.   77  215  5 0 0 125 + 77            J     SSNEWGC        . YES ,TRY NEXT GROUP
8105.   77  216 10 0 0  65 + 75            LD    AO,SSBNO       . NO,GIVE UP
8106.   77  217 10 4 0  60 + 75            LD    M4,SSCYCTIM    . NO PATTERN FOUND
8107.   77  220  5 0 0 251 + 77            J     SSPATRET       . RETURN
8108.   77  221 10 0 0  70 + 75  SSPATFN6  LD    AO,SSJ
8109.   77  222  3 0 0   6                 TNZ   AO             . FIRST TIME FOR THIS SSJ
8110.   77  223  5 0 0 230 + 77            J     SSPATFN7       . YES,SAVE THE NR. OF REPEATING PATTERNS
8111.   77  224 13 2 0 10? + 75            S     A2,SSNRGRPS    . NO
8112.   77  225  3 2 0   2                 TEZ   A2             . DID WE GET THE CORRECT NR. OF PATTERNS
8113.   77  226  5 0 0 211 + 77            J     SSGCTST        . NO
8114.   77  227  5 0 0 231 + 77            J     SSPATFN8       . YES
8115.   77  230 11 2 0 10? + 75  SSPATFN7  ST    A2,SSNRGRPS
8116.   77  231 12 0 0 157 + 75  SSPATFN8  A     AO,(1)
8117.   77  232 11 0 0  70 + 75            ST    AO,SSJ
8118.   77  233 13 0 0  64 + 75            S     AO,SSGPCNT     . INCREMENT TO NEXT PULSE IN PATTERN GROUP
8119.   77  234  3 0 0   6                 TGEZ  AO
8120.   77  235  5 0 0 143 + 77            J     SSNEWTJ        . IS J .GE.GROUP COUNTER?
8121.   77  236 10 0 0  67 + 75            LD    AO,SSI         . NO, CHECK FOR TRACK ON NEXT PULSE IN GROUP
8122.   77  237 13 0 0 157 + 75            S     AO,(1)         . NUMBER OF PULSES TO MATCH PREDICTION
8123.   77  240  3 0 0   4                 TGZ   AO             . MORE THAN ONE REPEATING PATTERN
8124.   77  241  5 0 0 211 + 77            J     SSGCTST        . NO
8125.   77  242 12 0 0 157 + 75            A     AO,(1)
8126.   77  243 13 0 0  65 + 75            S     AO,SSBNO       . NUMBER OF PULSES IN ARRAY - 1
8127.   77  244 12 0 0  64 + 75            A     AO,SSGPCNT
8128.   77  245  3 0 0   2                 TEZ   AO             . IS I= NO. PULSES-1?
8129.   77  246  5 0 0 211 + 77            J     SSGCTST        . NO, UP GROUP COUNTER AND TRY AGAIN
```

WESTINGHOUSE MILLI ASSEMBLER

```
8130.   77   247 10 4 0  71 + 75            LD     MQ,55NEWCT     . YES, SMALLEST REPEATABLE PATTERN FOUND
8131.   77   250 10 0 0  64 + 75            LD     AQ,55GPCNT     .      AND GROUP COUNTER=LEVEL OF STAGGER
8132.                            55PATRET   RETL   55PATFNX       . RETURN TO CALLING PROGRAM
8133.   77   251 10 6 0  11 + 75
8133.   35     0                 $(B4CBN5)
8134.   67                                  LIT    B4DBN6
8135.                            B4TRCG*    ENTL   B4TRCGX,B4DBN5,B4CBN5
8135.   65    23
8135.   65    23
8135.   35     0
8135.   35     0 11 5 0  21 + 65
8136.   35     1 10 0 0  75 + 65            LD     AQ,B1IBADR
8137.   35     2 10 4 0  77 + 65            LD     MQ,B4TDBA
8138.   35     3  1 4 0   n                 XB     MQ
8139.   35     4 11 0 0 172 + 67            ST     AQ,B4IBADR
8140.                            B4LAB41
8141.   35     5 10 4 0 224 + 67            LD     MQ,(B4DBN5*/8)
8142.   35     6  1 4 0   r                 XB     MQ
8143.   35     7 10 5 0  54 + 65            LD     IX,BIDTOP      . ADDRESS OF NEW IR
8144.   35    10  1 4 0   n                 XB     MQ
8145.   35    11  3 5 0   2                 TEZ    IX             . IS THERE A NEW IR?
8146.   35    12  5 0 0  26 + 35            J      B4LAB42        . YES, GO TO PROCESS
8147.   35    13 10 0 0 172 + 67            LD     AQ,B4IBADR
8148.   35    14  1 4 0   r                 XB     MQ
8149.   35    15 11 0 0  75 + 65            ST     AQ,B1IBADR
8150.   35    16  1 4 0   n                 XB     MQ
8151.   35    17 10 5 0 224 + 67            LD     IX,(B9DBN1*/8)
8152.   35    20  1 5 0   r                 XB     IX
8153.   70                                  LIT    B9DBN1
8154.                                       JSL    B9BDS1
8154.   35    21 10 5 0 324 + 70
8154.   35    22 10 6 0 311 + 70
8155.   35    23 10 5 0 252 + 70            LD     IX,(B1DBN1*/8)
8156.   35    24  1 5 0   n                 XB     IX
8157.   67                                  LIT    B4DBN6
8158.                                       RETL   B4TRCGX
8158.   35    25 10 6 0  21 + 65
8159.                            B4LAB42
8160.   35    26 12 5 0 227 + 67            A      IX,((B1DBN1-B4DBN6)*/8)
8161.   35    27 11 5 0 131 + 67            ST     IX,B4TIR       . PMB TO PROCESS
8162.   35    30 10 0 1  11                 LD,    AQ,B1IHITN     . CONTAINS ADDRESS OF NEXT PMB
8163.   35    31 10 4 0 224 + 67            LD     MQ,(B4DBN5*/8)
8164.   35    32  1 4 0   r                 XB     MQ
8165.   35    33 11 0 0  54 + 65            ST     AQ,BIDTOP
8166.   35    34 10 0 0  25 + 65            LD     AQ,BIFLGI
8167.   35    35  1 4 0   n                 XB     MQ
8168.   35    36  3 0 0   2                 TEZ    AQ             . IS THIS NORMAL PROCESSING ?
8169.   35    37  5 0 0  52 + 35            J      B4LAB42B       . NO, BEAM ALREADY IN IB LIST
8170.   35    40 10 0 1   1                 LD,    AQ,B1IBLIB     . YES
8171.   35    41  3 0 0   5                 TNZ    AQ             . DO WE WANT TO PROCESS THIS PMB?
8172.   35    42  5 0 0  5n + 35            J      B4LAB42A       . YES
```

We claim:

1. A tracking system for predicting the incidence of threat signals having at least one beam at a predetermined location in space, said system comprising:

a receiver for detecting the incidence of the threat signals;

a tracker that cooperates with said receiver to predict the detection of a threat signal by the receiver; and a controller that condenses threat signals from harmonically related beams of a pulse group detected by the receiver in response to a command signal from said controller, and that controls the predictions of said tracker in response to characteristics of the condensed threat signals.

2. A method for detecting radar threat signals, said method comprising the steps of:

detecting a group of radar beams having predetermined radar transmission characteristics; and condensing at least one subgroup of pulses which have substantially equivalent carrier frequency and harmonically related pulse repetition intervals from the detected group of radar beams to detect at least one threat signal having a plurality of pulse stagger levels with at least one pulse repetition interval nonidentical to the others.

3. The method of claim 2 wherein said condensing step includes:

determining the cycle time of the threat signal in response to the lowest common multiple of the beams in a condensed harmonic group and the shortest pulse repetition interval of the harmonic group;

standardizing the beams of the harmonic group with respect to the beam having a first time of arrival;

establishing an array of pulses detected within the determined cycle time;

deleting duplicate beams from the harmonic group;

finding the shortest repeating pattern in the established array of pulses; and determining the stagger range of the threat signal.

4. A threat signal radar detection system including a radar receiver for receiving radar beams constituting a plurality of threat signals, said system comprising a controller for condensing from said received radar beams at least one group of pulses which have substantially equivalent carrier frequency content and harmonically related pulse repetition intervals to detect at least one threat signal, having a plurality of pulse stagger levels with at least one pulse repetition interval being nonidentical to the others, from the plurality of received threat signals.

5. A radar detection system in accordance with claim 4 wherein the controller condenses the at least one group of pulses from the radar beams received from the receive during predetermined dwell times.

6. The system of claim 4 wherein said controller determines the cycle time of the at least one detected threat signal from the lowest common multiple of the beams in a harmonic group and the shortest pulse repetition interval of the harmonic group, standardizes the beams of the harmonic group with respect to the beam having a first time of arrival, establishes an array of pulses detected within one cycle time, deletes duplicate beams of the harmonic group, finds the shortest repeating pattern in the array of pulses, and determines the stagger range of the threat signal.

* * * * *